US012297856B2

(12) United States Patent
Zielinski et al.

(10) Patent No.: US 12,297,856 B2
(45) Date of Patent: May 13, 2025

(54) NUT PLATE GRIPPERS, END EFFECTORS THAT INCLUDE NUT PLATE GRIPPERS, ROBOTS THAT INCLUDE END EFFECTORS, INSTALLATION SYSTEMS THAT INCLUDE ROBOTS, AND RELATED METHODS

(71) Applicants: The Boeing Company, Arlington, VA (US); Strata Manufacturing PJSC, Al Ain (AE)

(72) Inventors: Benjamin S. Zielinski, Melbourne (AU); Jason Cochrane, Melbourne (AU); Ashkan Amirsadri, Melbourne (AU); Andre D. Swart, Al Ain (AE)

(73) Assignees: The Boeing Company, Arlington, VA (US); Strata Manufacturing PJSC (AE)

( * ) Notice: Subject to any disclaimer, the term of this patent is extended or adjusted under 35 U.S.C. 154(b) by 89 days.

(21) Appl. No.: 18/182,999

(22) Filed: Mar. 13, 2023

(65) Prior Publication Data
US 2024/0309905 A1 Sep. 19, 2024

(51) Int. Cl.
*F16B 37/04* (2006.01)
(52) U.S. Cl.
CPC ................................ *F16B 37/044* (2013.01)
(58) Field of Classification Search
CPC ............................. B23P 19/007; A61N 1/406
See application file for complete search history.

(56) References Cited

U.S. PATENT DOCUMENTS 2,689,491 A * 9/1954 Bredesen ................ B21K 5/06
76/5.1
2,835,150 A * 5/1958 Marcoux ................ B25D 9/20
72/313

(Continued)

FOREIGN PATENT DOCUMENTS

DE 3822435 A1 1/1990
JP 405084685 A 4/1993

(Continued)

OTHER PUBLICATIONS

Machine-generated English language translation of KR20150079289A, Jul. 8, 2015.

(Continued)

*Primary Examiner* — Jacob J Cigna
(74) *Attorney, Agent, or Firm* — Kolitch Romano Dascenzo Gates LLC

(57) ABSTRACT

Nut plate grippers, end effectors that include nut plate grippers, robots that include end effectors, installation systems that include robots, and related methods are disclosed herein. The nut plate grippers are configured to grip a nut plate and include an attachment region, a first resilient projecting region, and a second resilient projecting region. The first resilient projecting region extends from the attachment region and defines a first nut plate-contacting end. The second resilient projecting region extends from the attachment region and defines a second nut plate-contacting end. The first resilient projecting region and the second resilient projecting region are configured to resiliently deflect toward (Continued)

one another to facilitate insertion of the first nut plate-contacting end and the second nut plate-contacting end between a pair of opposed plate flanges of a base plate of the nut plate. The methods include methods of gripping a nut plate utilizing the nut plate grippers.

22 Claims, 12 Drawing Sheets

(56) References Cited

U.S. PATENT DOCUMENTS

| | | | |
|---|---|---|---|
| 3,711,006 A | | 1/1973 | Conner |
| 4,736,519 A | | 4/1988 | Roberts |
| 5,054,836 A | * | 10/1991 | Schulz ................ B25J 15/0206 |
| | | | 414/932 |
| 5,214,837 A | | 6/1993 | Stafford |
| 6,428,452 B1 | | 8/2002 | Dahlstroem et al. |
| 6,769,595 B2 | * | 8/2004 | Stol .................... B23K 20/1295 |
| | | | 228/2.1 |
| 10,899,083 B1 | * | 1/2021 | Rice ...................... F16B 11/006 |
| 11,027,326 B2 | * | 6/2021 | Eusterwiemann .... B23P 19/002 |
| 11,148,175 B2 | * | 10/2021 | Coffey .................... B24B 23/02 |
| 11,255,371 B2 | * | 2/2022 | Dubberly ............. F16B 37/044 |
| 2006/0218780 A1 | | 10/2006 | Lewis et al. |
| 2018/0250734 A1 | * | 9/2018 | Savoy ...................... B21J 15/28 |
| 2019/0070657 A1 | | 3/2019 | Skolaude |
| 2020/0391330 A1 | * | 12/2020 | Hughes ................ B23P 19/006 |
| 2021/0172191 A1 | * | 6/2021 | Rauma ................. E04H 12/003 |

FOREIGN PATENT DOCUMENTS

| | | |
|---|---|---|
| JP | 409266613 A | 10/1997 |
| JP | 2008183637 A | 8/2008 |
| KR | 20150079289 A | 7/2015 |

OTHER PUBLICATIONS

Machine-generated English language translation of Description and Claims in DE3822435A1, Jan. 4, 1990.
Machine-generated English language translation of Abstract for JP2008183637A, Aug. 8, 2008.
Machine-generated English language translation of Abstract for JP405084685A, Apr. 6, 1993.
Machine-generated English language translation of Abstract in JP409266613A, Oct. 7, 1997.
European Patent Office, Extended European Search Report in related App. No. EP24162325, Aug. 29, 2024.

* cited by examiner

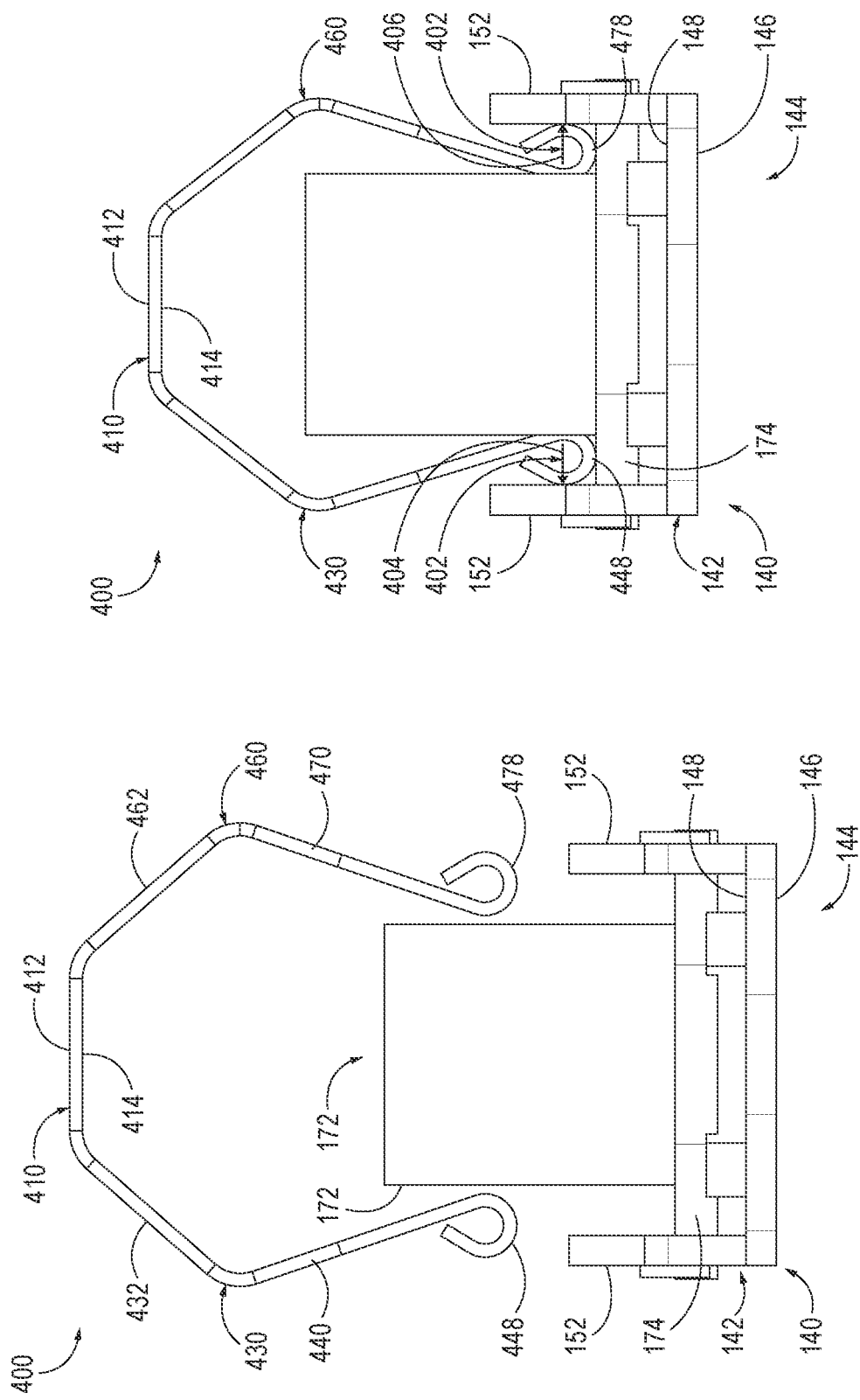

NUT PLATE GRIPPERS, END EFFECTORS THAT INCLUDE NUT PLATE GRIPPERS, ROBOTS THAT INCLUDE END EFFECTORS, INSTALLATION SYSTEMS THAT INCLUDE ROBOTS, AND RELATED METHODS

FIELD

The present disclosure relates generally to nut plate grippers, to end effectors that include nut plate grippers, to robots that include end effectors, to installation systems that include robots, and/or to related methods.

BACKGROUND

Nut plates may be utilized, within a structure, to secure two components of the structure to one another. Nut plates historically have been manually installed while held in place during an assembly process in which the two components are secured to one another. While effective, this process is labor-intensive. The overall shape of the nut plates makes it difficult to reliably and reproducibly position the nut plates at a desired location during the assembly process. Thus, there exists a need for nut plate grippers, for end effectors that include the nut plate grippers, for robots that include the end effectors, for installation systems that include the robots, and/or for related methods.

SUMMARY

Nut plate grippers, end effectors that include nut plate grippers, robots that include end effectors, installation systems that include robots, and related methods are disclosed herein. The nut plate grippers are configured to grip a nut plate and include an attachment region, a first resilient projecting region, and a second resilient projecting region. The attachment region is configured to facilitate attachment of the nut plate gripper to the end effector. The first resilient projecting region extends from the attachment region and defines a first nut plate-contacting end. The second resilient projecting region extends from the attachment region and defines a second nut plate-contacting end. The first resilient projecting region and the second resilient projecting region are configured to resiliently deflect toward one another to facilitate insertion of the first nut plate-contacting end and the second nut plate-contacting end between a pair of opposed plate flanges of a base plate of the nut plate.

The methods include aligning a first nut plate-contacting region of a first resilient projecting region of the nut plate gripper and a second nut plate-contacting region of a second resilient projecting region of the nut plate gripper with a pair of opposed plate flanges of a base plate of the nut plate. The methods also include gripping the nut plate with the nut plate gripper by moving the nut plate gripper and the nut plate toward one another such that the first nut plate-contacting end and the second nut plate-contacting end are positioned between the pair of opposed plate flanges and apply a retaining force to the pair of opposed plate flanges.

BRIEF DESCRIPTION OF THE DRAWINGS

FIG. 6 is an example of a nut plate gripper aligned with a nut plate, according to the present disclosure.

FIG. 7 is an example of a nut plate gripper gripping a nut plate, according to the present disclosure.

DESCRIPTION

Figure 1:
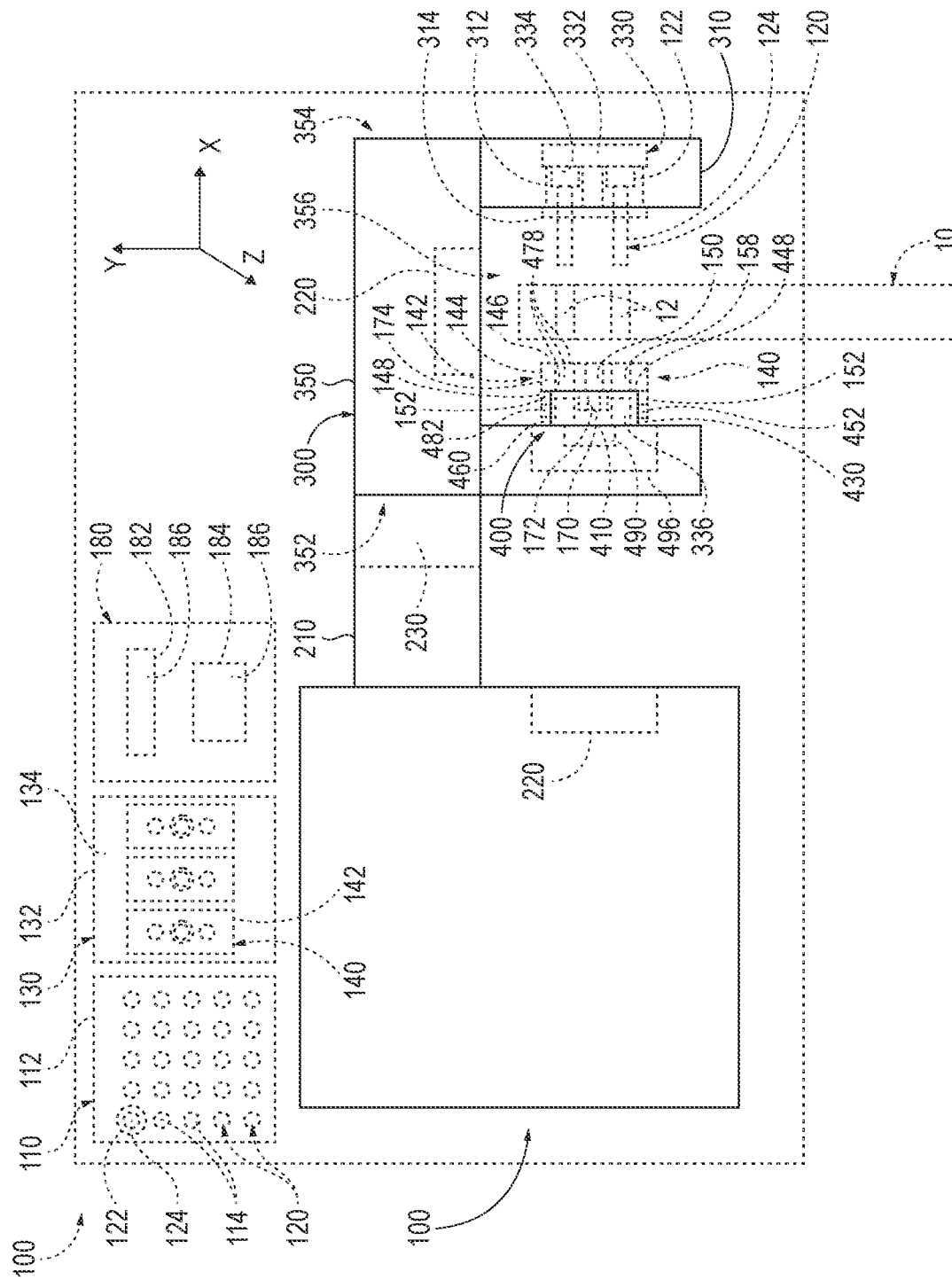
FIG. 1 is a schematic illustration of examples of a nut plate installation system that includes a nut plate installation robot that includes an end effector that includes a nut plate gripper, according to the present disclosure.

FIGS. 1-15 provide illustrative, non-exclusive examples of nut plate grippers 400, of end effectors 300 that include nut plate grippers 400, of nut plate installation robots 200 that include end effectors 300, of nut plate installation systems 100 that include nut plate installation robots 200, and/or of methods 500 and 600, according to the present disclosure. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
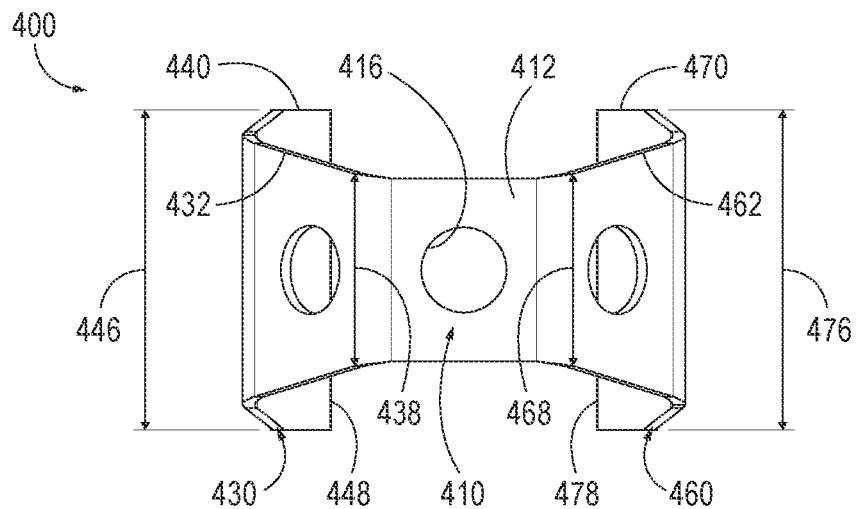
FIG. 2 is a less schematic top view illustrating an example of a nut plate gripper according to the present disclosure.
Figure 3:
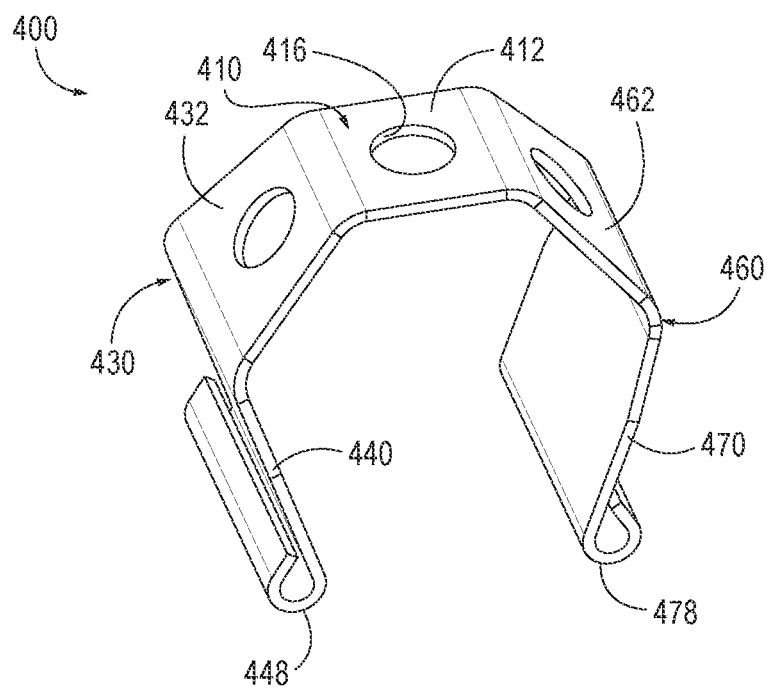
FIG. 3 is a less schematic side view illustrating an example of a nut plate gripper according to the present disclosure.
Figure 4:
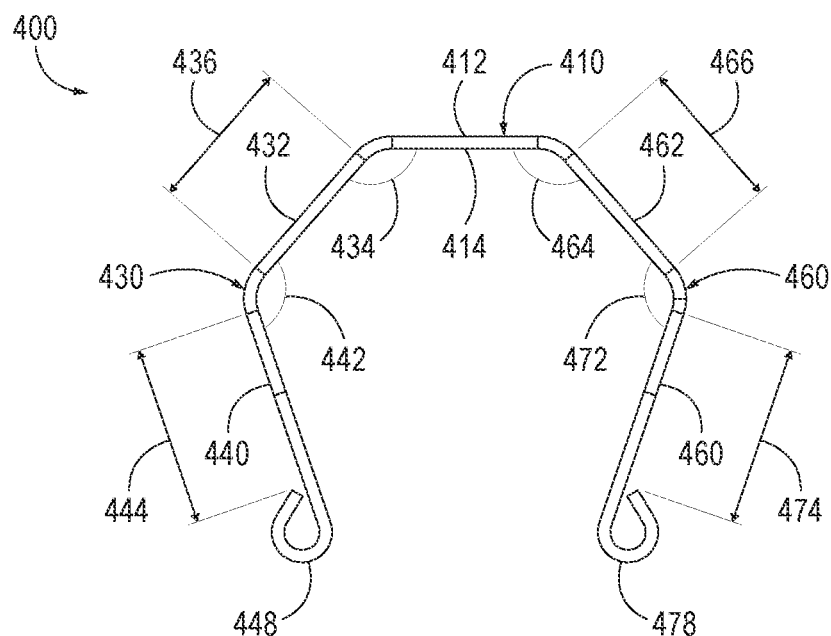
FIG. 4 is a less schematic front view illustrating an example of a nut plate gripper according to the present disclosure.

FIG. 1 is a schematic illustration of examples of a nut plate gripper 400, which may be included in an end effector 300, which may be included in a nut plate installation robot 200, which may be included in a nut plate installation system 100, according to the present disclosure. FIGS. 2-4 are less schematic views illustrating an example of a nut plate gripper 400 according to the present disclosure. Nut plate gripper 400 is configured to grip a nut plate 140, and FIG. 6 is an example of a nut plate gripper 400 aligned with a nut plate 140, while FIG. 7 is an example of a nut plate gripper 400 gripping a nut plate 140, according to the present disclosure. FIGS. 2-4 and/or 6-7 may include and/or be more detailed and/or less schematic illustrations of nut plate gripper 400 that is schematically illustrated in FIG. 1. With this in mind, any of the structures, functions, and/or features that are disclosed herein with reference to nut plate gripper 400 of FIGS. 2-4 and/or 6-7 may be included in and/or utilized with nut plate gripper 400 of FIG. 1 without departing from the scope of the present disclosure. Similarly, any of the structures, functions, and/or features that are disclosed herein with reference to nut plate installation system 100, nut plate installation robot 200, end effector 300, and/or nut plate gripper 400 of FIG. 1 may be included in and/or utilized with nut plate gripper 400 of FIGS. 2-4 and/or 6-7 without departing from the scope of the present disclosure.

With general reference to the examples illustrated in FIGS. 1-4 and 6-7, nut plate gripper 400 includes an attachment region 410, which may be configured to facilitate attachment of the nut plate gripper to end effector 300, which is illustrated in FIG. 1. Nut plate gripper 400 also includes a first resilient projecting region 430 and a second resilient projecting region 460. First resilient projecting region 430 extends from attachment region 410 and defines a first nut plate-contacting end 448. Similarly, second resilient projecting region 460 extends from attachment region 410 and defines a second nut plate-contacting end 478.

First resilient projecting region 430 and second resilient projecting region 460 may be configured to resiliently deflect toward one another to facilitate insertion of first nut plate-contacting end 448 and second nut plate-contacting end 478 between a pair of opposed plate flanges 152 of a base plate 142 of nut plate 140, as illustrated in FIGS. 1 and 6-7. Additionally or alternatively, and when first nut plate-contacting end 448 and second nut plate-contacting end 478 are positioned between the pair of opposed plate flanges 152, first resilient projecting region 430 and second resilient projecting region 460 may be configured to apply a retaining force 402, as illustrated in FIG. 7, to the pair of opposed plate flanges 152. The retaining force may retain nut plate 140 on nut plate gripper 400.

Figure 5:
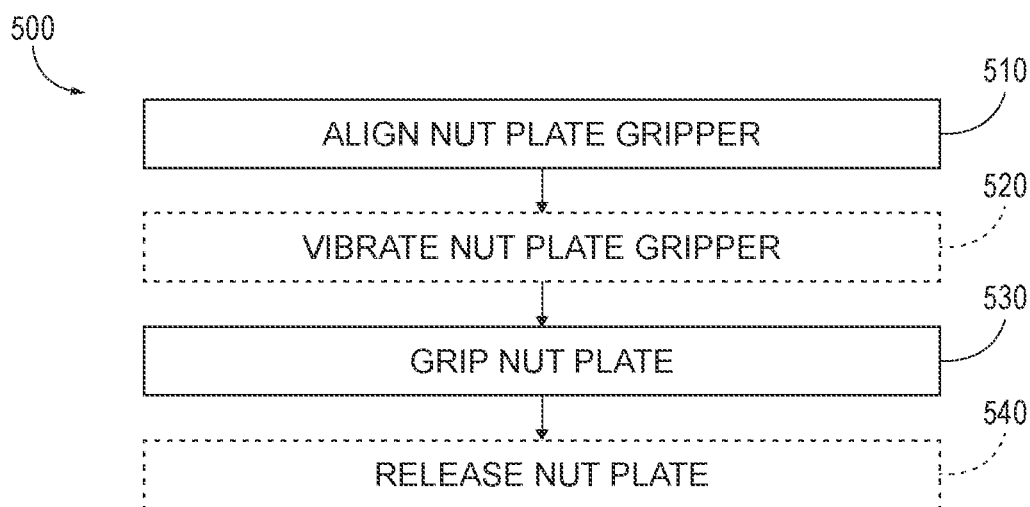
FIG. 5 is a flowchart depicting examples of methods of gripping a nut plate utilizing a nut plate gripper, according to the present disclosure.

When nut plate gripper 400 is utilized to grip nut plates 140, and as discussed in more detail herein with reference to methods 500 of FIG. 5, nut plate gripper 400 may be aligned with nut plate 140, as illustrated in FIG. 6. This alignment may be such that first nut plate-contacting end 448 of first resilient projecting region 430 and second nut plate-contacting end 478 of second resilient projecting region 460 are aligned with the pair of opposed plate flanges 152 of base plate 142 of nut plate 140. Subsequently, nut plate gripper 400 may be utilized to grip nut plate 140. This may include motion of nut plate gripper 400 and nut plate 140 toward one another such that first nut plate-contacting end 448 and second nut plate-contacting end 478 are positioned between the pair of opposed plate flanges 152 and apply retaining force 402 thereto, as illustrated in FIG. 7.

Attachment region 410 may include any suitable structure that may be adapted, configured, designed, and/or constructed to facilitate attachment of nut plate gripper 400 to a suitable end effector 300. As an example, and as perhaps best illustrated in FIGS. 2-3, nut plate gripper 400 may include a fastener-receiving region 416. Fastener-receiving region 416 may be configured to receive a fastener that operatively attaches nut plate gripper 400 to end effector 300. An example of fastener-receiving region 416 includes a fastener-receiving hole, which may be defined within, may extend within, and/or may extend through nut plate gripper 400. Examples of the fastener include a rivet, a threaded fastener, a screw, a bolt, and/or a nut.

Attachment region 410 may define a planar, or at least substantially planar, end effector-facing side 412, as illustrated in FIGS. 2-4 and 6-7. Stated differently, attachment region 410 may include and/or be a planar, or at least substantially planar, attachment region 410. Such a configuration may increase a contact area between nut plate gripper 400 and end effector 300, thereby increasing a rigidity and/or a reliability of the interconnection therebetween. Attachment region 410 also may define an end effector-opposed side 414, and first resilient projecting region 430 and/or second resilient projecting region 460 may extend from end effector-opposed side 414 and/or away from end effector-facing side 412.

First resilient projecting region 430 and second resilient projecting region 460 may include and/or be any suitable structure and may define any suitable shape that may extend from attachment region 410 and/or that may define first nut plate-contacting end 448 and second nut plate-contacting end 478, respectively. In some examples, first resilient projecting region 430 and second resilient projecting region 460 may symmetrically extend from attachment region 410. Stated differently, first resilient projecting region 430 and second resilient projecting region 460 may be mirror, or at least substantially mirror, images of one another. Stated still differently, first resilient projecting region 430 and second resilient projecting region 460 may be symmetric about an axis of symmetry that extends therebetween.

In some examples, and as perhaps best illustrated in FIGS. 2-4 and 6-7, first resilient projecting region 430 may include a first divergent region 432 and a first convergent region 440. First divergent region 432 may extend from attachment region 410 and tapers away from second resilient projecting region 460. First convergent region 440 extends from first divergent region 432 to first nut plate-contacting end 448 and tapers toward second resilient projecting region 460.

First divergent region 432 may extend from attachment region 410 at a first divergent region angle 434, as illustrated in FIG. 4. Examples of first divergent region angle 434 include obtuse first divergent region angles, as well as first divergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, first divergent region 432 may include and/or be a planar, or at least substantially planar, first divergent region 432. Stated differently, at least a portion, or subset, of a surface area of first divergent region 432 may be planar, or at least substantially planar.

In some examples, first divergent region 432 may extend a first divergent region length 436 from attachment region 410, as illustrated in FIG. 4. Examples of first divergent region length 436 include lengths of at least 1 millimeter (mm), at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, first divergent region 432 may have and/or define an average first divergent region width 438, as illustrated in FIG. 2. Examples of average first divergent region width 438 include widths of at least 2 mm, at least 2.5 mm, at least 3 mm, at least 3.5 mm, at least 4 mm, at least 4.5 mm, at least 5 mm, at least 5.5 mm, at least 6 mm, at most 12 mm, at most 10 mm, at most 9 mm, at most 8 mm, at most 7 mm, at most 6 mm, at most 5 mm, and/or at most 4 mm.

In some examples, first convergent region 440 may extend at a first convergent region angle 442 relative to first divergent region 432, as illustrate in FIG. 4. Examples of first convergent region angle 442 include obtuse first convergent region angles, as well as first convergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, first convergent region 440 may include and/or be a planar, or at least substantially planar, first convergent region 440. Stated differently, at least a portion, or subset, of a surface area of first convergent region 440 may be planar, or at least substantially planar.

In some examples, first convergent region 440 may extend a first convergent region length 444 from first divergent region 432, as illustrated in FIG. 4. Examples of first convergent region length 444 include lengths of at least 1 millimeter (mm), at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, first convergent region 440 may have and/or define an average first convergent region width 446, as illustrated in FIG. 2. Examples of average first convergent region width 446 include widths of at least 5 mm, at least 5.5 mm, at least 6 mm, at least 6.5 mm, at least 7 mm, at least 7.5 mm, at least 8 mm, at least 8.5 mm, at least 9 mm, at most 15 mm, at most 14 mm, at most 13 mm, at most 12 mm, at most 11 mm, at most 10 mm, at most 9 mm, and/or at most 8 mm.

In some examples, first convergent region 440 may include a first pair of opposed ramps 452, as illustrated in FIG. 1. The first pair of opposed ramps 452 may be positioned on opposed sides of first convergent region 440 and may project away from first convergent region 440 such that, when nut plate gripper 400 grips nut plate 140, opposed outer edges of a first nut plate flange of plate flanges 152 face toward the first pair of opposed ramps 452. First pair of opposed ramps 452 may be angled relative to one another and/or relative to the opposed outer edges of the first nut plate flange. Such a configuration may permit and/or facilitate precise and/or reproducible positioning of nut plate 140 relative to nut plate gripper 400 along a length of first nut plate-contacting end 448 thereof and/or along the Z-axis that is illustrated in FIG. 1.

First nut plate-contacting end 448 may have and/or define any suitable shape. As an example, and as perhaps best illustrated in FIGS. 2-4 and 6-7, first nut plate-contacting end 448 may include and/or be a rounded first nut plate-contacting end 448. Such a configuration may facilitate gripping of nut plate 140 by nut plate gripper 400, such as by facilitating insertion of first nut plate-contacting end 448 between the pair of opposed plate flanges 152 of base plate 142 of nut plate 140.

In some examples, and as perhaps best illustrated in FIGS. 2-4 and 6-7, second resilient projecting region 460 may include a second divergent region 462 and a second convergent region 470. Second divergent region 462 may extend from attachment region 410 and tapers away from first resilient projecting region 430. Second convergent region 470 extends from second divergent region 462 to second nut plate-contacting end 478 and tapers toward first resilient projecting region 430.

Second divergent region 462 may extend from attachment region 410 at a second divergent region angle 464, as illustrated in FIG. 4. Examples of second divergent region angle 464 include obtuse second divergent region angles, as well as second divergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, second divergent region 462 may include and/or be a planar, or at least substantially planar, second divergent region 462. Stated differently, at least a portion, or subset, of a surface area of second divergent region 462 may be planar, or at least substantially planar.

In some examples, second divergent region 462 may extend a second divergent region length 466 from attachment region 410, as illustrated in FIG. 4. Examples of second divergent region length 466 include lengths of at least 1 millimeter (mm), at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, second divergent region 462 may have and/or define an average second divergent region width 468, as illustrated in FIG. 2. Examples of average second divergent region width 468 include widths of at least 2 mm, at least 2.5 mm, at least 3 mm, at least 3.5 mm, at least 4 mm, at least 4.5 mm, at least 5 mm, at least 5.5 mm, at least 6 mm, at most 12 mm, at most 10 mm, at most 9 mm, at most 8 mm, at most 7 mm, at most 6 mm, at most 5 mm, and/or at most 4 mm.

In some examples, second convergent region 470 may extend at a second convergent region angle 472 relative to second divergent region 462, as illustrate in FIG. 4. Examples of second convergent region angle 472 include obtuse second convergent region angles, as well as second convergent region angles 472 of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, second convergent region 470 may include and/or be a planar, or at least substantially planar, second convergent region 470. Stated differently, at least a portion, or subset, of a surface area of second convergent region 470 may be planar, or at least substantially planar.

In some examples, second convergent region 470 may extend a second convergent region length 474 from second divergent region 462, as illustrated in FIG. 4. Examples of second convergent region length 474 include lengths of at least 1 millimeter (mm), at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, second convergent region 470 may have and/or define an average second convergent region width 476, as illustrated in FIG. 2. Examples of average second convergent region width 476 include widths of at least 5 mm, at least 5.5 mm, at least 6 mm, at least 6.5 mm, at least 7 mm, at least 7.5 mm, at least 8 mm, at least 8.5 mm, at least 9 mm, at most 15 mm, at most 14 mm, at most 13 mm, at most 12 mm, at most 11 mm, at most 10 mm, at most 9 mm, and/or at most 8 mm.

In some examples, second convergent region 470 may include a second pair of opposed ramps 482, as illustrated in FIG. 1. The second pair of opposed ramps 482 may be positioned on opposed sides of second convergent region 470 and may project away from second convergent region 470 such that, when nut plate gripper 400 grips nut plate 140, opposed outer edges of a second plate flange of plate flanges 152 face toward the second pair of opposed ramps 482. Second pair of opposed ramps 482 may be angled relative to one another and/or relative to the opposed outer edges of the second plate flange. Such a configuration may permit and/or facilitate precise and/or reproducible positioning of nut plate 140 relative to nut plate gripper 400 along a length of second nut plate-contacting end 478 thereof and/or along the Z-axis that is illustrated in FIG. 1.

Second nut plate-contacting end 478 may have and/or define any suitable shape. As an example, and as perhaps best illustrated in FIGS. 2-4 and 6-7, second nut plate-contacting end 478 may include and/or be a rounded second nut plate-contacting end 478. Such a configuration may facilitate gripping of nut plate 140 by nut plate gripper 400, such as by facilitating insertion of second nut plate-contacting end 478 between the pair of opposed plate flanges 152 of base plate 142 of nut plate 140.

Nut plate gripper 400 may grip nut plate 140 in any suitable manner. As an example, and with reference to FIG. 7, when nut plate gripper 400 grips nut plate 140, a first retaining force 404 of first resilient projecting region 430 and a second retaining force 406 of second resilient projecting region 460 may act against base plate 142 of nut plate 140. More specifically, first retaining force 404 and second retaining force 406 may act against the pair of opposed plate flanges 152 of base plate 142, such as to retain nut plate 140 on nut plate gripper 400.

As another example, and when nut plate gripper 400 grips nut plate 140, first nut plate-contacting end 448 may be configured to define a corresponding two-point contact with the base plate 142 of the nut plate 140 to locate base plate 142 relative to first nut plate-contacting end 448 in two dimensions, such as the X and Y dimensions of FIG. 1. In addition, second nut plate-contacting end 478 may be configured to define another corresponding two-point contact with the base plate 142 of nut plate 140 to locate base plate 142 relative to second nut plate-contacting end 478 in the two dimensions, such as the X and Y dimensions of FIG. 1. Such a configuration may cause nut plate gripper 400 and nut plate 140 to have a predetermined, consistent, and/or repeatable relative orientation, at least in the two dimensions, such as the X and Y dimensions of FIG. 1, when nut plate gripper 400 grips nut plate 140. In addition, and when nut plate gripper 400 includes first pair of opposed ramps 452 and/or second pair of opposed ramps 482, nut plate gripper 400 and nut plate 140 also may have a predetermined, consistent, and/or repeatable relative orientation in a third dimension, such as the Z dimension of FIG. 1.

It is within the scope of the present disclosure that nut plate gripper 400 may be configured to repeatedly grip, and also to repeatedly release, nut plate 140. This repeated grip and/or repeated release may be performed without damage to nut plate 140 and/or nut plate gripper 400. Stated differently, nut plate gripper 400 may be configured to be utilized with and/or to position a plurality of different nut plates 140, such as via methods 500 and/or 600 that are discussed in more detail herein.

Nut plate gripper 400 may include and/or may be defined from any suitable structure and/or material. In some examples, nut plate gripper 400 may include and/or be a unitary nut plate gripper 400 and/or a monolithic nut plate gripper 400. Stated differently, nut plate gripper 400 may be formed and/or defined from a single and/or from a continuous nut plate gripper material. In some examples, nut plate gripper 400 may include and/or be a metallic nut plate gripper 400. In some examples, nut plate gripper 400 may be defined by a, or a single, strip of steel and/or strip of spring steel. In some examples, nut plate gripper 400 may include and/or be a formed metallic strip.

Nut plate gripper 400 may be configured to passively grip nut plate 140 responsive to an insertion force that urges first nut plate-contacting end 448 and second nut plate-contacting end 478 between the pair of opposed plate flanges 152. This is illustrated by the transition from the configuration that is illustrated in FIG. 6 to the configuration that is illustrated in FIG. 7. Additionally or alternatively, nut plate gripper 400 may be configured to passively release nut plate 140 responsive to a separation force that urges first nut plate-contacting end 448 and second nut plate-contacting end 478 from between the pair of opposed plate flanges 152. This is illustrated by the transition from the configuration that is illustrated in FIG. 7 to the configuration that is illustrated in FIG. 6.

As illustrated in dashed lines in FIG. 1, nut plate gripper 400 may include a vibration structure 490. Vibration structure 490, when present, may be adapted, configured, designed, and/or constructed to vibrate first resilient projecting region 430 and/or second resilient projecting region 460. This vibration may be utilized to permit and/or to facilitate insertion of first nut plate-contacting end 448 and second nut plate-contacting end 478 between the pair of opposed plate flanges 152 of nut plate 140. Additionally or alternatively, this vibration may be utilized to permit and/or facilitate positioning of base plate rivet openings 158 of nut plate 140 onto corresponding rivets 120, as is discussed in more detail herein. An example of vibration structure 490 includes a vibration motor.

As also illustrated in FIG. 1, and while not required of all embodiments, nut plate gripper 400 may include a gripper actuator 496. Gripper actuator 496, when present, may be configured to selectively urge first resilient projecting region 430 and second resilient projecting region 460 toward one another. This may facilitate insertion of first nut plate-contacting end 448 and second nut plate-contacting end 478 between the pair of opposed plate flanges 152 and/or may facilitate separation of nut plate gripper 400 from the nut plate 140. Additionally or alternatively, gripper actuator 496 may be configured to selectively urge first resilient projecting region 430 and second resilient projecting region 460 away from one another, such as to cause nut plate gripper 400 to grip nut plate 140. Examples of gripper actuator 496 include a mechanical actuator, a pneumatic actuator, a hydraulic actuator, a cam, and/or a double-acting cam.

Nut plate 140 may include and/or be any suitable structure that may be adapted, configured, designed, sized, and/or constructed to permit and/or facilitate attachment of two of more components of a structure 10, such as an aircraft, as illustrated in FIG. 1. In some examples, and with general reference to FIGS. 1 and 6-7, nut plate 140 may include base plate 142. Base plate 142 may have and/or define the pair of opposed plate flanges 152. In addition, base plate 142 may define a structure-contacting region 144 that defines a structure-facing side 146 and a structure-opposed side 148. Base plate 142 also may define a fastener opening 150 which may extend through structure-contacting region 144 of base plate 142 and/or may extend between structure-facing side 146 and structure-opposed side 148. Base plate 142 further may define base plate rivet openings 158, which may be configured to receive rivets 120.

Nut plate 140 also may include a nut 170. Nut 170 may be operatively attached to base plate 142. In addition, nut 170 may define a threaded central opening 172, which may be aligned with fastener opening 150 of base plate 142. Nut 170 may be operatively attached to structure-opposed side 148 of base plate 142 and/or may be positioned between the pair of opposed plate flanges 152. Nut plate 140 may be configured to permit limited motion of nut 170 relative to base plate 142. As an example, a spring clip 174 may operatively attach nut 170 to base plate 142 while permitting the limited motion. As discussed, nut plate gripper 400 may be configured to define a two-point contact between first nut plate-contacting end 448 and nut plate 140 and also between second nut plate-contacting end 478 and nut plate 140. This two-point contact may include one point of contact between first nut plate-contacting end 448 and/or second nut plate-contacting end 478 and a corresponding region of spring clip 174 and a second point of contact between first nut plate-contacting end 448 and/or second nut plate-contacting end 478 and a corresponding one of the pair of opposed plate flanges 152, as illustrated in FIG. 7.

As discussed, nut plate 140 may be configured to permit limited motion of nut 170 relative to base plate 142. Such a configuration may permit and/or facilitate improved utilization of nut plate 140 to attach the two or more components of structure 10, such as via permitting a corresponding fastener to be inserted into threaded central opening 172 despite minor misalignment. However, such a configuration also causes a relative orientation between base plate 142 and threaded central opening 172 to be inconsistent and/or to vary, at least within the constraints of the permitted limited motion. With this in mind, and as discussed, nut plate gripper 400, according to the present disclosure, may grip nut plate 140 without extending within threaded central opening 172. Stated differently, and when nut plate gripper 400 grips nut plate 140, nut plate gripper 400 may be entirely external threaded central opening 172. Such a configuration may permit nut plate gripper 400, according to the present disclosure, to grip and/or to position nut plate 140 more precisely and/or reproducibly than would be possible if nut plate gripper 400 were to extend within threaded central opening 172 and/or to grip nut plate 140 via threaded central opening 172.

With general reference to FIGS. 1 and 9-15, end effector 300 may be configured to rivet nut plate 140 to structure 10. End effector 300 includes a nut plate gripper 400. End effector 300 also includes a rivet holder 310 and a yoke 350, which defines a nut plate gripper side 352 and a rivet holder side 354. Nut plate gripper 400 may be operatively attached to nut plate gripper side 352 and/or rivet holder 310 may be operatively attached to rivet holder side 354. This operative attachment may be such that nut plate gripper 400 and rivet holder 310 define a structure-receiving region 356 therebetween. Nut plate gripper 400 may be configured to grip nut plate 140 such that structure-facing side 146 of structure-contacting region 144 of base plate 142 of nut plate 140 faces toward structure-receiving region 356. Rivet holder 310 may be configured to selectively retain a plurality of rivet heads 122 of a plurality of corresponding rivets 120. This operative retention may be such that a plurality of pins 124 of rivets 120 extends toward structure-receiving region 356. Pins 124 also may be referred to herein as and/or may be tails 124 of rivets 120.

Figure 9:
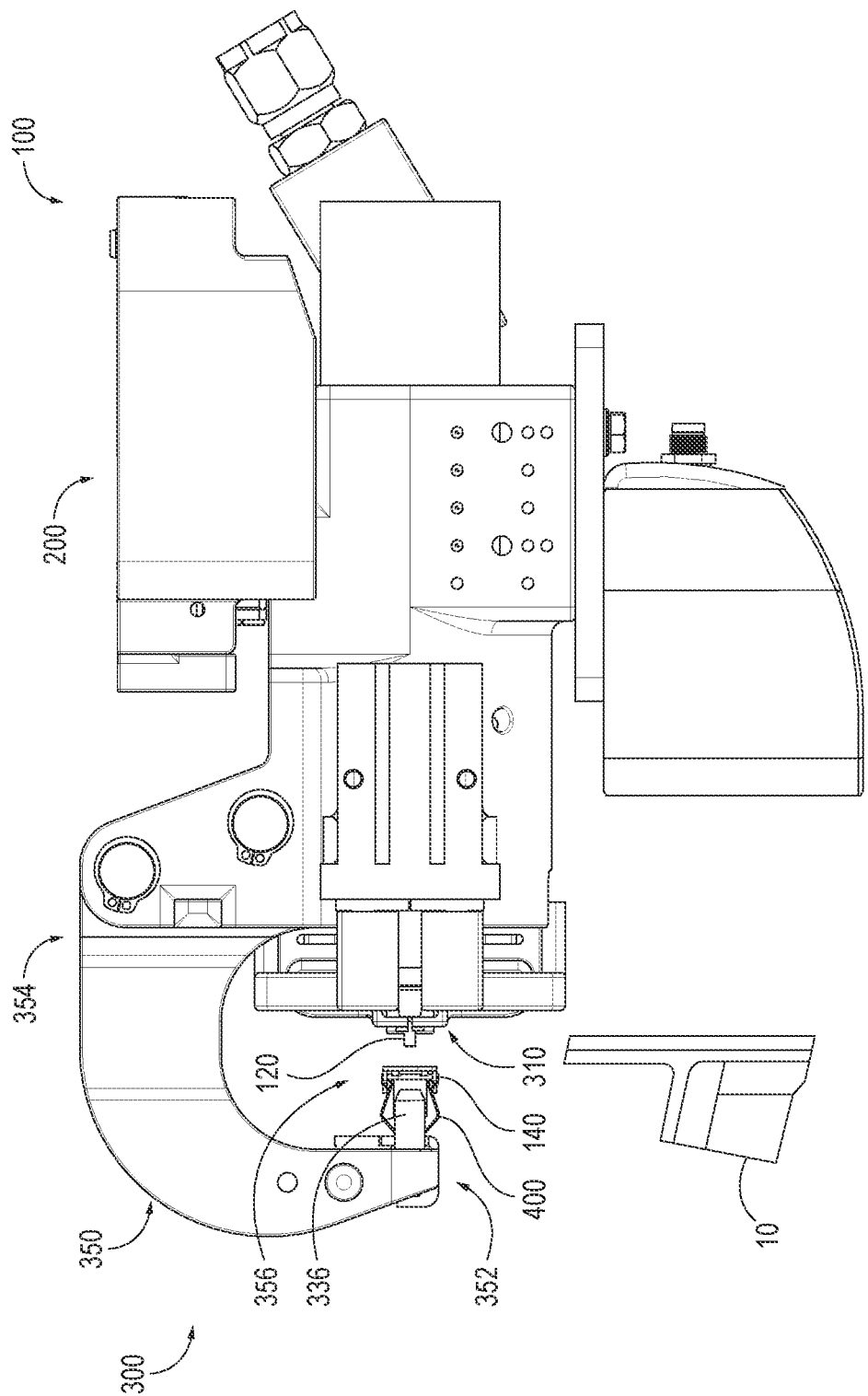
FIG. 9 is an illustration of a nut plate installation system during the methods of FIG. 8.
Figure 11:
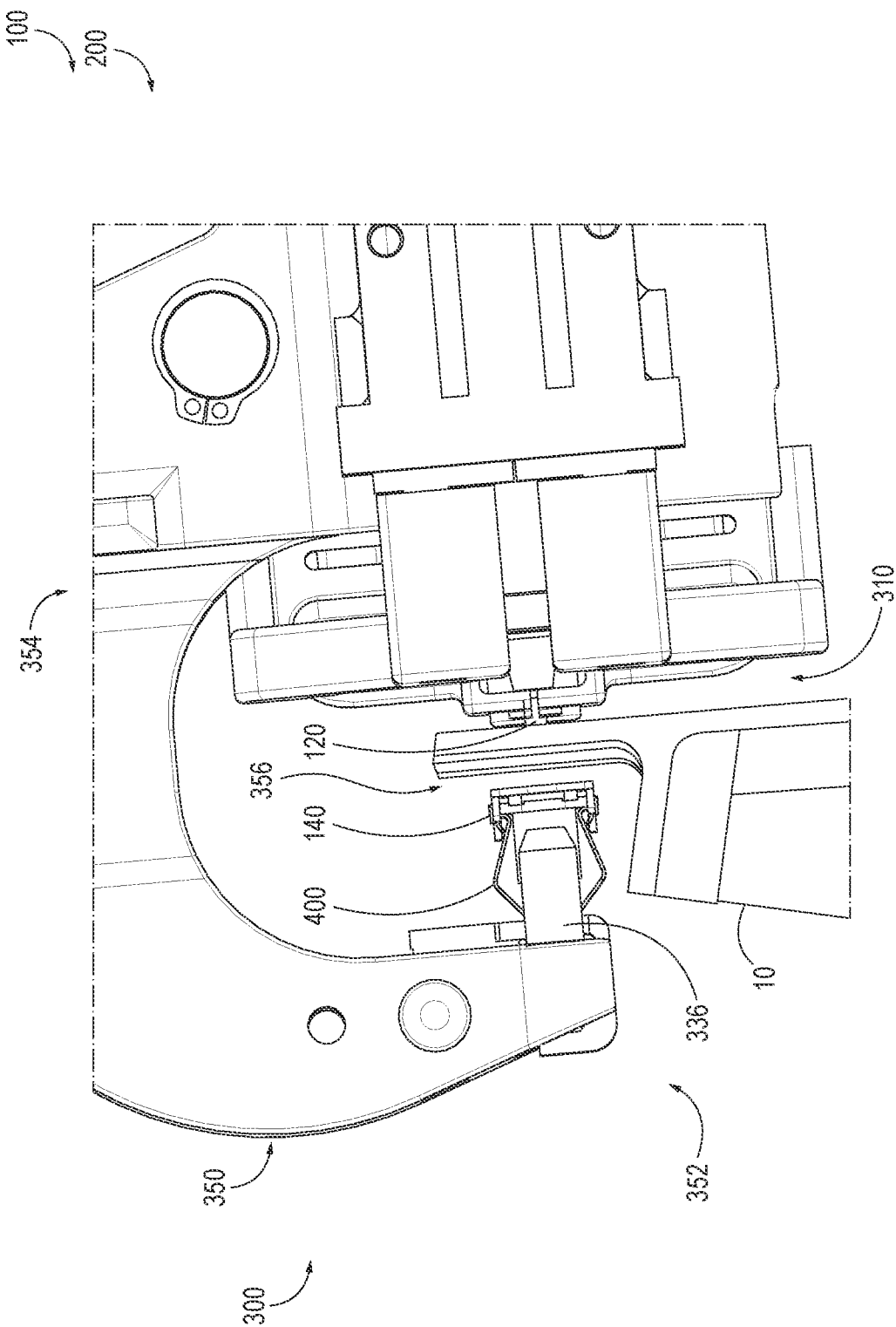
FIG. 11 is an illustration of a nut plate installation system during the methods of FIG. 8.
Figure 12:
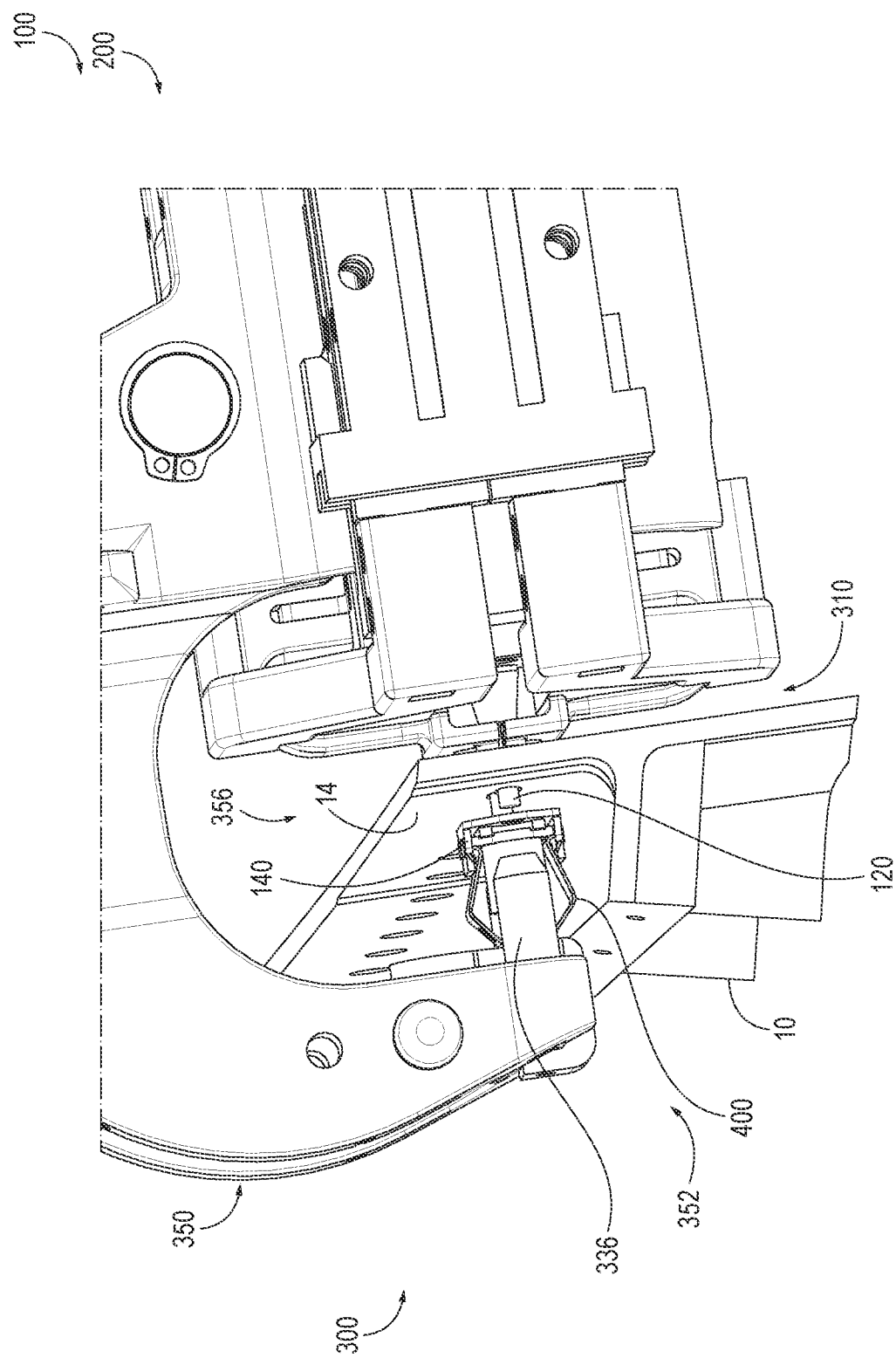
FIG. 12 is an illustration of a nut plate installation system during the methods of FIG. 8.
Figure 13:
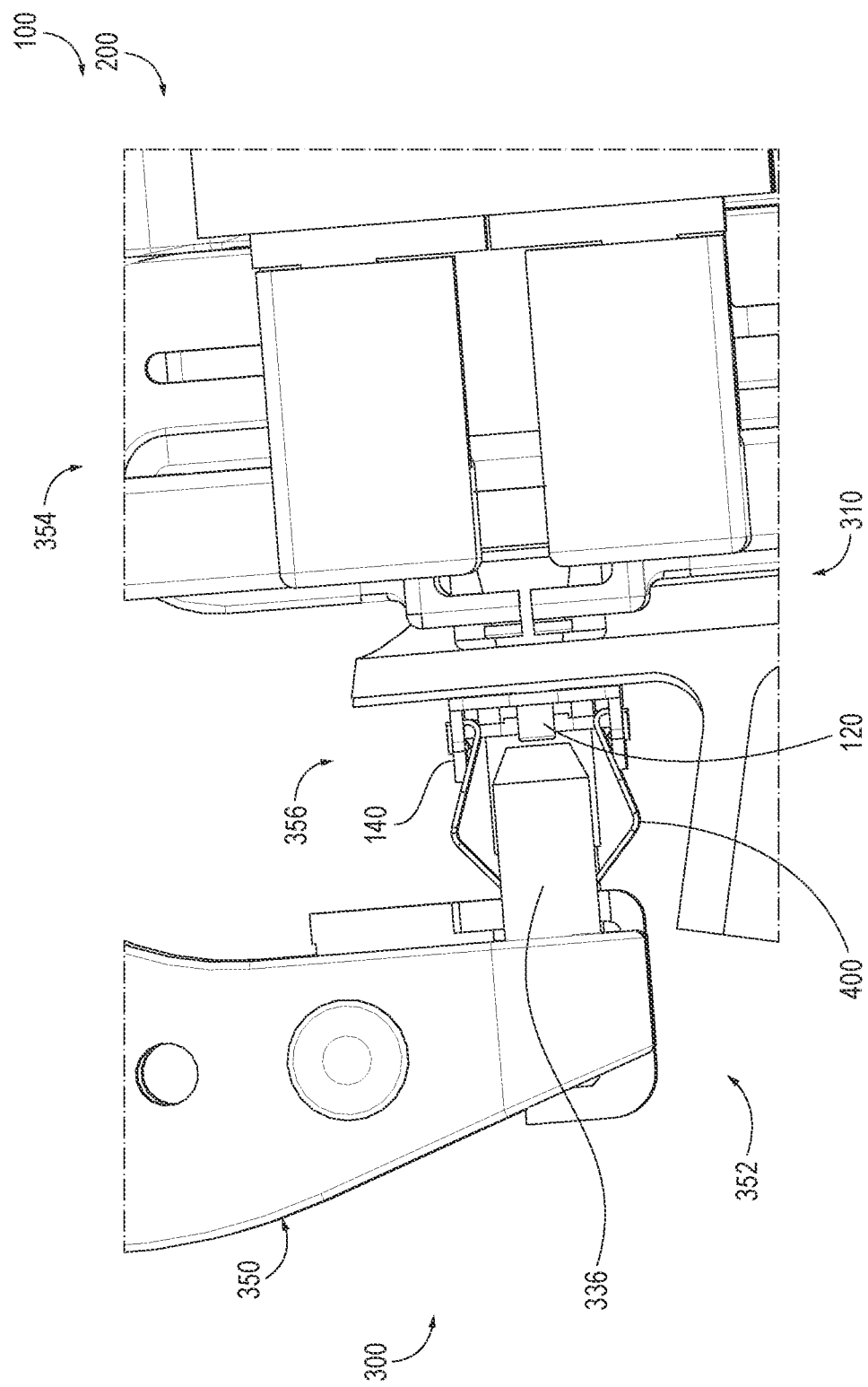
FIG. 13 is an illustration of a nut plate installation system during the methods of FIG. 8.
Figure 14:
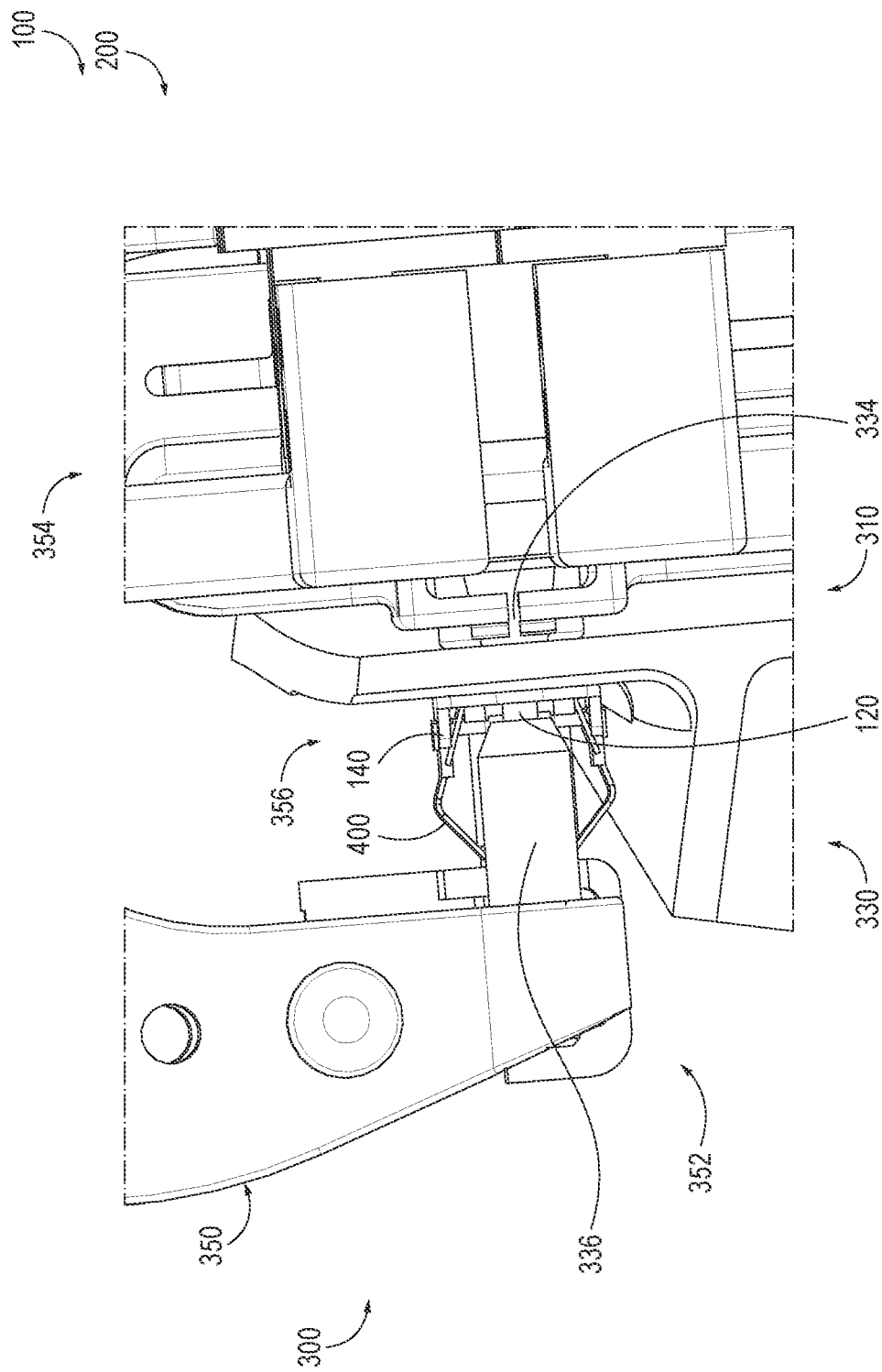
FIG. 14 is an illustration of a nut plate installation system during the methods of FIG. 8.
Figure 15:
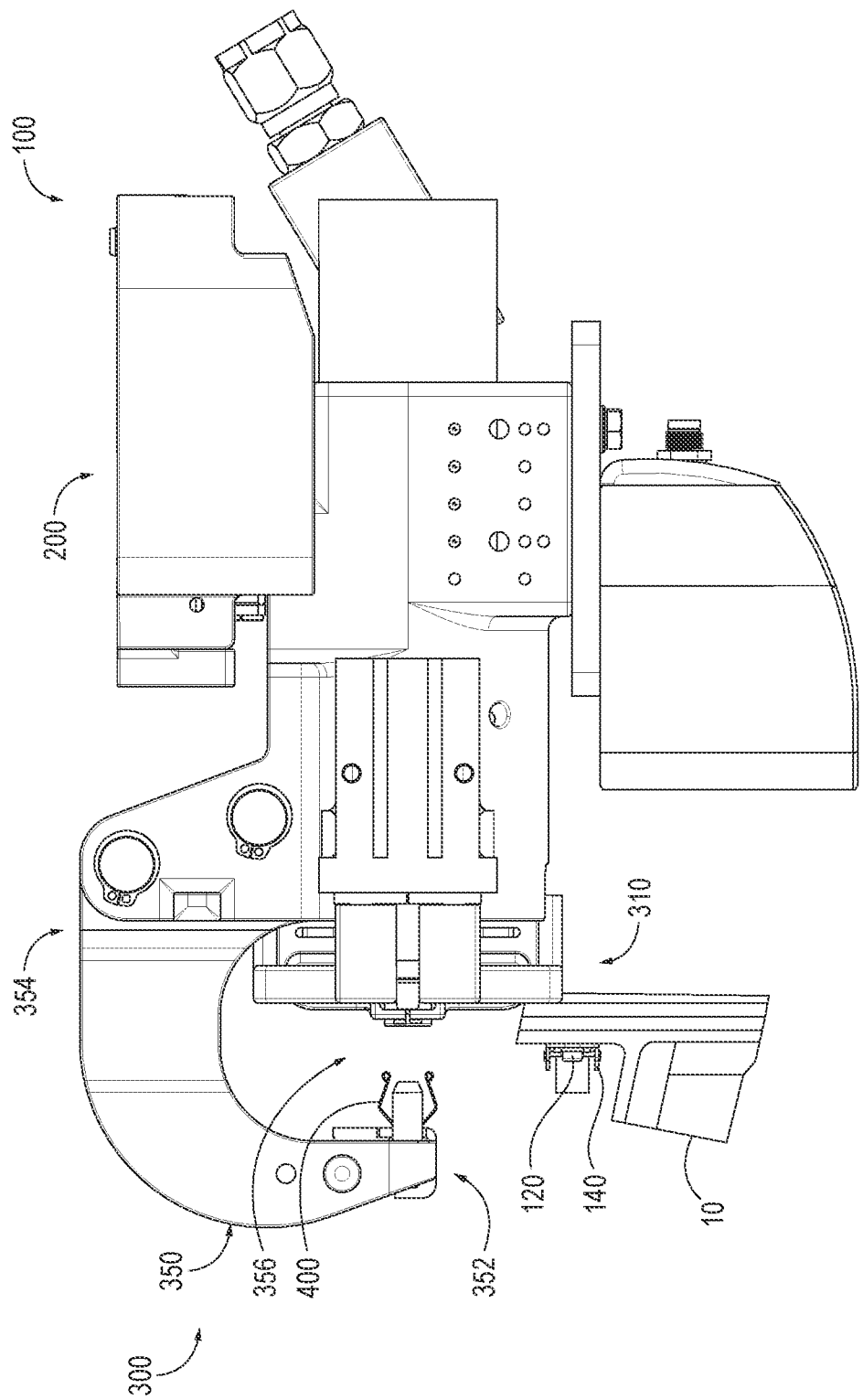
FIG. 15 is an illustration of a nut plate installation system during the methods of FIG. 8.

When end effector 300 is utilized to rivet nut plate 140 to structure 10, and as discussed in more detail herein with reference to methods 500 of FIG. 5, nut plate gripper 400 may grip a corresponding nut plate 140 and rivet holder 310 may retain a plurality of rivets 120, as illustrated in FIGS. 1 and 9. Subsequently, end effector 300 may be oriented such that nut plate 140 and rivets 120 both are positioned at a desired location on structure 10 with structure 10 extending within structure-receiving region 356, as illustrated in FIG. 11. Then, rivets 120 may be inserted through corresponding holes in structure 10, as illustrated in FIG. 12. Subsequently, nut plate 140 may be positioned over rivets 120, as illustrated in FIG. 13; and rivets 120 may be set by end effector 300, as illustrated in FIG. 14, such that nut plate 140 is operatively attached to structure 10, as illustrated in FIG. 15.

Nut plate gripper 400 may include any suitable structure that may be operatively attached to nut plate gripper side 352 and/or that may be adapted, configured, designed, and/or constructed to grip nut plate 140. Examples of nut plate gripper 400 are disclosed herein; however, it is within the scope of the present disclosure that end effector 300 may include and/or utilize other nut plate grippers 400 in addition to, or instead of, those that are disclosed herein.

In some examples, nut plate gripper 400 may be configured to grip a structure-opposed side 148 of nut plate 140 and/or of base plate 142 of nut plate 140. In some examples, and when nut plate gripper 400 grips nut plate 140, nut plate gripper 400 may be external, or entirely external, a threaded central opening 172 of a nut 170 of nut plate 140. In some examples, nut plate gripper 400 may be configured to grip a pair of opposed plate flanges 152 of base plate 142. In some such examples, nut plate gripper 400 may be configured to apply a tensile retaining force to the pair of opposed plate flanges 152. In some examples, nut plate gripper 400 may be configured to utilize a vacuum force to grip nut plate 140.

In some examples, nut plate gripper 400 may be configured to passively grip nut plate 140. In some examples, end effector 300 and/or nut plate gripper 400 includes a gripper actuator 496. Gripper actuator 496, when present, may be configured to actively actuate nut plate gripper 400 to grip nut plate 140. Examples of gripper actuator 496 are disclosed herein.

In some examples, end effector 300 and/or nut plate gripper 400 may include a vibration structure 490. Vibration structure 490, when present, may be configured to vibrate nut plate gripper 400. This vibration may be utilized to facilitate alignment of nut plate gripper 400 with nut plate 140 and/or to facilitate alignment of nut plate 140 with structure 10 and/or with rivets 120.

Rivet holder 310 may include any suitable structure that may be operatively attached to rivet holder side 354 of yoke 350, that may face toward nut plate gripper 400, and/or that may selectively retain the plurality of rivets 120. In some examples, and as illustrated in FIG. 1, rivet holder 310 may include a plurality of rivet-receiving regions 312. Rivet-receiving regions 312 may be adapted, configured, sized, and/or shaped to receive the plurality of rivets 120.

In some examples, and as also illustrated in FIG. 1, rivet holder 310 may include a rivet gripper 314. Rivet gripper 314 may be configured to selectively grip the plurality of rivets 120. As an example, rivet gripper 314 may define a gripping state, in which rivet gripper 314 retains the plurality of rivets 120 within rivet holder 310, and a free state, in which the plurality of rivets 120 is free to be separated from rivet holder 310, such as via motion along at least one separation axis.

In some examples, rivet holder 310 may be configured to selectively retain the plurality of rivet heads 122 of rivets 120 such that a relative orientation of the plurality of pins 124 corresponds to a relative orientation of a plurality of base plate rivet openings 158 of base plate 142. Additionally or alternatively, rivet holder 310 may be configured to selectively retain the plurality of rivet heads 122 such that the relative orientation of the plurality of pins 124 corresponds to a relative orientation of a plurality of structure rivet openings 12 defined within structure 10.

In some examples, and as illustrated in dashed lines in FIG. 1, end effector 300 may include a rivet set structure 330. Rivet set structure 330 may be configured to set the plurality of rivets 120 such that the plurality of rivets operatively attaches base plate 142 of nut plate 140 to structure 10. Rivet set structure 330 may include any suitable structure that may be utilized to set the plurality of rivets 120 and/or to operatively attach base plate 142 to structure 10.

As an example, rivet set structure 330 may include an anvil 334 and a die 336. Anvil 334 may be configured to act upon the plurality of rivet heads 122 to compress the plurality of rivets 120 between anvil 334 and die 336.

As another example, rivet set structure 330 may include set structure linear actuator 332. Set structure linear actuator 332 may be configured to operatively translate anvil 334 relative to die 336 to compress the plurality of rivets 120 between anvil 334 and die 336.

Anvil 334 may be operatively attached to rivet holder side 354 of yoke 350 and/or may face toward nut plate gripper side 352 of yoke 350. Die 336 may be operatively attached to nut plate gripper side 352 of yoke 350 and/or may face toward nut plate gripper side 352 of yoke 350. Die 336 may extend at least partially between a first resilient projecting region 430 and a second resilient projecting region 460 of nut plate gripper 400. Die 336 also may include a chamfered die end, which may be sized to provide clearance between die 336 and nut plate gripper 400. Such a configuration may permit and/or facilitate utilization of end effector 300 to attach nut plates 140 to structures 10 that may be spatially constrained. Additionally or alternatively, such a configuration may permit and/or facilitate operative attachment of nut plates 140 to structures 10 utilizing nut plate grippers 400 that are disclosed herein.

Turning more particularly to FIG. 1, nut plate installation robot 200 includes a robot arm 210, an end effector 300, and a vision system 220. Robot arm 210 may be configured to be operatively attached to, to support, and/or to move end effector 300. Vision system 220 may be configured to view end effector 300, nut plate gripper 400, nut plate 140, the plurality of rivets 120, and/or structure 10. This may permit and/or facilitate alignment among nut plate 140, the plurality of rivets 120, and structure 10. In some examples, vision system 220 additionally or alternatively may be configured to view a sealant application structure 180, a rivet kitting structure 110, and/or a nut plate kitting structure 130, which are discussed in more detail herein. This may permit alignment of end effector 300 with rivet kitting structure 110, such as to facilitate receipt of rivets 120 by end effector 300 and/or from rivet kitting structure 110. This also may permit alignment of end effector 300 with nut plate kitting structure 130, such as to facilitate receipt of nut plate 140 by nut plate gripper and/or from nut plate kitting structure 130. This also may permit alignment of end effector 300 with sealant application structure 180, such as to facilitate application of a sealant 186 to nut plate 140 by sealant application structure 180.

Inclusion of vision system 220 within nut plate installation robot 200 may decrease a potential for, or even eliminate, manual teaching of the operation of nut plate installation robot 200. The inclusion of vision system 220 additionally or alternatively may permit nut plate installation robot 200 to recognize, or to visually recognize, various structures, including rivets 120, nut plate 140, rivet kitting structure 110, nut plate kitting structure 130, and/or sealant application structure 180. Furthermore, vision system 220 may be utilized, by nut plate installation robot 200, to recognize, or to distinguish, different rivets 120, nut plates 140, and/or structures 10 that may be utilized by and/or operated on by nut plate installation robot 200.

Vision system 220 may include any suitable structure, examples of which include a camera and a digital camera. In addition, vision system 220 may be positioned, may be operatively attached to, and/or may be configured to view any suitable structure. As an example, and as illustrated in FIG. 1, vision system 220 may be operatively attached to yoke 350. Such a configuration may permit vision system 220 to view structure-receiving region 356 and/or components of end effector 300 that may be positioned therein. As another example, vision system 220 may be operatively attached to another component of nut plate installation robot 200 and/or may be configured to view other regions of nut plate installation robot 200 and/or an environment that surrounds nut plate installation robot 200.

As illustrated in dashed lines in FIG. 1, nut plate installation robot 200 may include a linear slide 230, which may operatively attach end effector 300 to another component of nut plate installation robot 200, such as to robot arm 210. Linear slide 230 may be configured to translate end effector 300 along a translation axis that may be parallel, or at least substantially parallel, to an axis along which set structure linear actuator 332 moves anvil 334. Such a configuration may permit nut plate installation robot 200 to bring nut plate 140 into contact with structure 10 and/or to move the end effector along the translation axis without a need to move an entirety of nut plate installation robot 200, thereby improving an overall accuracy and/or precision of installation of nut plate 140 by nut plate installation robot 200.

With continued reference to FIG. 1, nut plate installation system 100 includes nut plate installation robot 200. Nut plate installation system 100 also includes rivet kitting structure 110, nut plate kitting structure 130, and/or sealant application structure 180, which may be configured to apply sealant 186 to nut plate 140.

Figure 8:
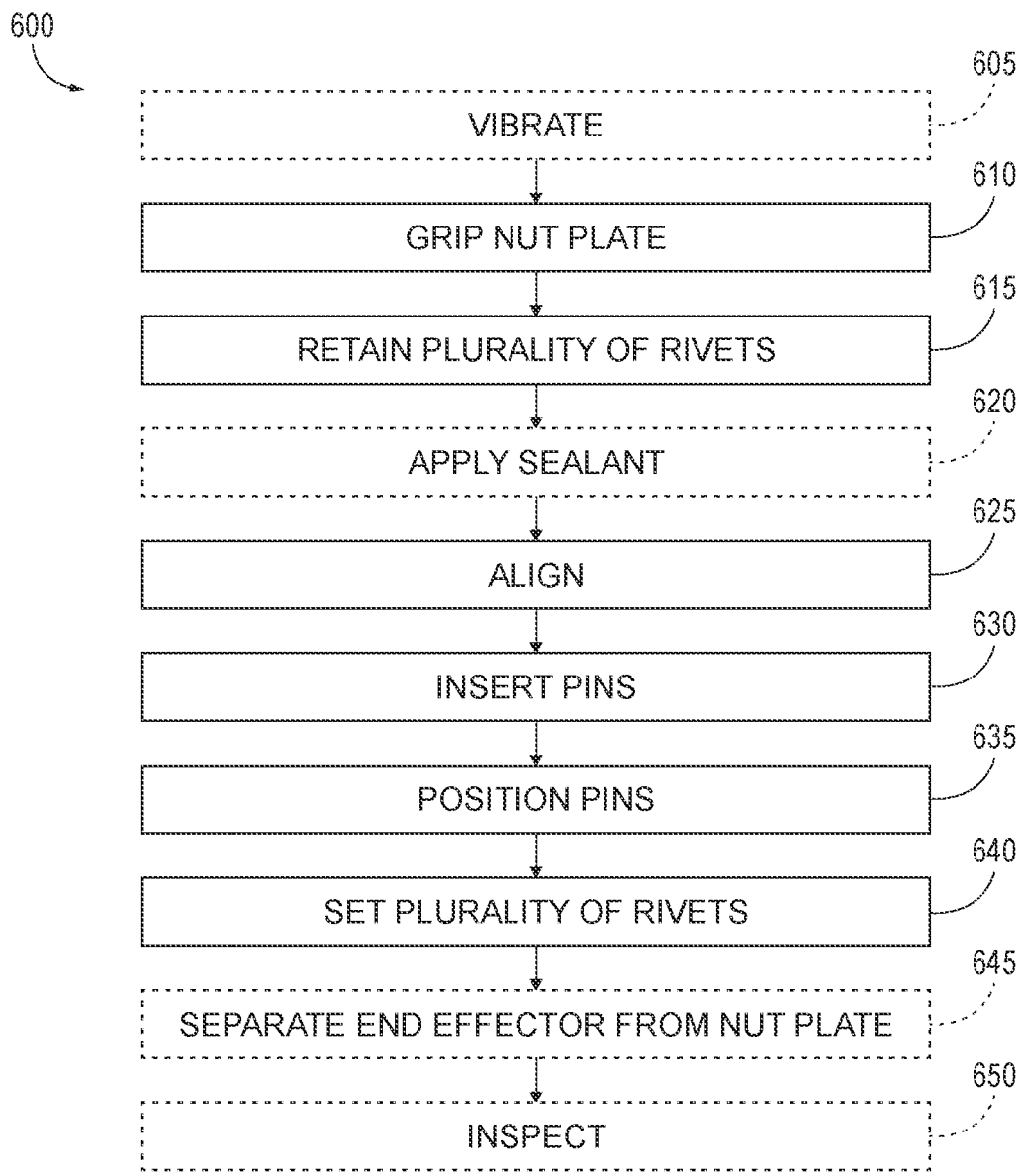
FIG. 8 is a flowchart depicting examples of methods of utilizing a nut plate installation system according to the present disclosure.

During operation of nut plate installation system 100, and as discussed in more detail herein with reference to methods 600 of FIG. 8, robot arm 210 may be utilized to position end effector 300 relative to structure 10, rivet kitting structure 110, nut plate kitting structure 130, and/or sealant application structure 180. As an example, robot arm 210 may position end effector 300 relative to structure 10 to permit and/or facilitate attachment of nut plate 140 to structure 10. As another example, robot arm 210 may position end effector 300 relative to rivet kitting structure 110, such as to permit and/or facilitate receipt of rivets 120 from rivet kitting structure 110 and/or by rivet holder 310. As yet another example, robot arm 210 may position end effector 300 relative to nut plate kitting structure 130, such as to permit and/or facilitate receipt of a nut plate 140 by nut plate gripper 400. As another example, robot arm 210 may position end effector 300 relative to sealant application structure 180, such as to permit and/or facilitate application of sealant 186 to nut plate 140.

Rivet kitting structure 110 may include and/or be any suitable structure that may be adapted, configured, designed, sized, and/or constructed to house, to contain, and/or to support the plurality of rivets 120, to present the plurality of rivets 120 to end effector 300, and/or to orient the plurality of rivets 120 such that the plurality of rivets 120 may be received by rivet holder 310 of end effector 300. In some examples, the plurality of rivets supported by rivet kitting structure 110 may include and/or be a single type, or a single size, of rivets 120. In other examples, rivet kitting structure 110 may support a plurality of different types of rivets 120, with each type of rivet 120 being designated for use with a corresponding type of nut plate 140 and/or for a corresponding location on structure 10. In such a configuration, rivet kitting structure 110 may include a plurality of carousels, with each carousel supporting a distinct, or a different, type of rivet 120. Additionally or alternatively, and in such a configuration, vision system 220 may be configured to distinguish and/or to recognize the different types of rivets 120, thereby permitting nut plate installation system 100 to selectively position a desired type of rivet 120 within rivet holder 310 of end effector 300.

As discussed, end effector 300 may be configured to support a plurality of rivets 120 within rivet holder 310. With this in mind, rivet kitting structure 110 may contain, or may be configured to contain, a plurality of sets of the plurality of corresponding rivets 120, such as to permit and/or to facilitate nut plate installation robot 200 to receive the plurality of rivets 120 a plurality of times from rivet kitting structure 110.

Rivet kitting structure 110 may support rivets 120 in any suitable manner. As an example, rivet kitting structure 110 may include a plurality of resilient receptacles 114, which may be configured to resiliently retain the plurality of rivets 120. As a more specific example, resilient receptacles 114 may be configured to deform and/or stretch to receive the plurality of rivets 120 and may press against the plurality of rivets with a restoring force that retains the plurality of rivets within rivet kitting structure 110.

In some examples, rivet kitting structure 110 may be configured to retain the plurality of rivets 120 in a vertical orientation. Stated differently, rivet kitting structure 110 may be configured to retain the plurality of rivets such that pins 124 of rivets 120 extend vertically upward from corresponding rivet heads 122 of rivets 120. Such a configuration may permit end effector 300 to grip both rivets 120 and nut plate 140 without a need to rotate end effector 300 about a horizontal axis, thereby decreasing an overall complexity of nut plate installation robot 200.

In some examples, rivet kitting structure 110 may include and/or be a rotary rivet kitting structure 112. Rotary rivet kitting structure 112 may be configured to rotate to make the plurality of rivets 120 accessible to end effector 300.

Nut plate kitting structure 130 may include and/or be any suitable structure that may be adapted, configured, designed, sized, and/or constructed to house, to contain, and/or to support a plurality of nut plates 140, to supply at least one nut plate 140 of the plurality of nut plates 140 to end effector 300 and/or to orient nut plates 140 such that nut plates 140 may be gripped by nut plate gripper 400 of end effector 300. In some examples, the plurality of nut plates 140 supported by nut plate kitting structure 130 may include and/or be a single type, or a single size, of nut plates 140. In other examples, nut plate kitting structure 130 may support a plurality of different types of nut plates 140, with each type of nut plate 140 being designated for use with a corresponding type of rivet 120 and/or for a corresponding location on structure 10. In such a configuration, nut plate kitting structure 130 may include a plurality of carousels, with each carousel supporting a distinct, or a different, type of nut plate 140. Additionally or alternatively, and in such a configuration, vision system 220 may be configured to distinguish and/or to recognize the different types of nut plates 140, thereby permitting nut plate installation system 100 to selectively grip a desired type of nut plate 140 with nut plate gripper 400 of end effector 300.

In some examples, nut plate kitting structure 130 may be configured to support nut plates 140 on a horizontal nut plate kitting structure surface 134. In some examples, nut plate kitting structure 130 may include and/or be a rotary nut plate kitting structure 132. Rotary nut plate kitting structure 132 may be configured to rotate to make nut plates 140, or a given nut plate 140, accessible to end effector 300.

Sealant application structure 180 may include and/or be any suitable structure that may be adapted, configured, designed, sized, and/or constructed to house, to contain, and/or to support sealant 186 and/or to apply sealant 186 to nut plates 140 while nut plates 140 are gripped by nut plate gripper 400. This may include application of sealant 186 to structure-facing side 146 of structure-contacting region 144 of base plate 142 of nut plates 140. An example of sealant application structure 180 includes a roller 182, which may be configured to apply sealant 186 to nut plate 140 and/or to structure-facing side 146 thereof. Another example of sealant application structure 180 includes a volume 184 of sealant 186 within which nut plate installation robot 200 may be configured to dip nut plate 140 and/or structure-facing side 146 thereof.

In some examples of nut plate installation systems 100, according to the present disclosure, sealant application structure 180 may be configured to apply sealant 186 to nut plate 140 and/or to structure-facing side 146 thereof while nut plate 140 is gripped by nut plate gripper 400 and/or while structure 10 is spaced-apart from structure-receiving region 356 of end effector 300. Such a configuration may increase an accuracy with which sealant 186 may be positioned between nut plate 140 and structure 10 once nut plate 140 is attached to structure 10.

FIG. 5 is a flowchart depicting examples of methods 500 of gripping a nut plate utilizing a nut plate gripper, according to the present disclosure. Methods 500 include aligning a nut plate gripper at 510 and may include vibrating the nut plate gripper at 520. Methods 500 also include gripping the nut plate at 530 and may include releasing the nut plate at 540.

Aligning the nut plate gripper at 510 may include aligning a first nut plate-contacting end of a first resilient projecting region of the nut plate gripper with a pair of opposed plate flanges of a base plate of the nut plate. The aligning at 510 also may include aligning a second nut plate-contacting end of a second resilient projecting region of the nut plate gripper with the pair of opposed plate flanges. The aligning at 510 is illustrated in FIG. 6.

Examples of the nut plate gripper and/or components thereof are disclosed herein with reference to nut plate gripper 400. Examples of the nut plate and/or components thereof are disclosed herein with reference to nut plate 140.

Vibrating the nut plate gripper at 520 may include vibrating any suitable component of the nut plate gripper. As examples, the vibrating at 520 may include vibrating the first nut plate-contacting end of the nut plate gripper and/or vibrating the second nut plate-contacting end of the nut plate gripper. The vibrating at 520 may be performed in any suitable manner and/or utilizing any suitable structure. As an example, the nut plate gripper may include a vibration structure, which may be configured to provide a motive force for the vibrating at 520. Examples of the vibration structure are disclosed herein with reference to vibration structure 490.

The vibrating at 520 may be performed with any suitable timing and/or sequence during methods 500. As examples, the vibrating at 520 may be performed prior to, subsequent to, and/or at least partially concurrently with the aligning at 510, the gripping at 530, and/or the releasing at 540.

Gripping the nut plate at 530 may include gripping the nut plate with the nut plate gripper. This may include moving the nut plate gripper and the nut plate toward one another and/or such that the first nut plate-contacting end and the second nut plate-contacting end are positioned between the pair of opposed plate flanges. Additionally or alternatively, the gripping at 530 may include positioning the first nut plate-contacting end and the second nut plate-contacting end such that the first nut plate-contacting end and the second nut plate-contacting end apply a retaining force to the pair of opposed plate flanges. The vibrating at 520, when performed, may be performed at least partially concurrently with the moving. The retaining force may include and/or be a tensile retaining force, which may place at least a region of the nut plate in tension. Examples of the retaining force are disclosed herein with reference to retaining force 402.

In some examples, the retaining force may include a first retaining force, which is applied in a first force direction and/or by the first nut plate-contacting end. In some examples, the retaining force may include a second retaining force, which is applied in a second force direction and/or by the second nut plate-contacting end. Examples of the first retaining force are disclosed herein with reference to first retaining force 404. Examples of the second retaining force are disclosed herein with reference to second retaining force 406.

In some examples, the gripping at 530 and/or the moving may include establishing a corresponding two-point contact between the first nut plate-contacting end and the nut plate. In some examples, the gripping at 530 and/or the moving additionally or alternatively may include establishing a corresponding two-point contact between the second nut plate-contacting end and the nut plate. As discussed in more detail herein, such two-point contact may locate, precisely locate, and/or reproducibly locate the nut plate, relative to the nut plate gripper, in two dimensions.

In some examples, the gripping at 530 and/or the moving may include positioning a first opposed plate flange of the pair of opposed plate flanges between a first pair of opposed ramps of the nut plate gripper, such as to locate the nut plate and the nut plate gripper relative to one another in a third dimension. The first pair of opposed ramps may be defined on and/or by the first resilient projecting region. In some examples, the gripping at 530 and/or the moving may include positioning a second opposed plate flange of the pair of opposed plate flanges between a second pair of opposed ramps of the nut plate gripper, such as to locate the nut plate and the nut plate gripper relative to one another in a third dimension. The second pair of opposed ramps may be defined on and/or by the second resilient projecting region. The third dimension may be perpendicular to the two dimensions. Examples of the first pair of opposed ramps are disclosed herein with reference to first pair of opposed ramps 452. Examples of the second pair of opposed ramps are disclosed herein with reference to second pair of opposed ramps 482.

In some examples, the gripping at 530 and/or the moving may include deflecting the first resilient projecting region and the second resilient projecting region toward one another. This may permit the first nut plate-contacting end and the second nut plate-contacting end to be positioned between the pair of opposed plate flanges. In some such examples, the retaining force may include and/or be a restoring force, which may be generated by the deflecting.

In some examples, and during the gripping at 530, the nut plate gripper may be external, or entirely external, a threaded central opening of a nut of the nut plate. Additionally or alternatively, and during the gripping at 530, the nut plate gripper may be free from direct physical contact with the threaded central opening.

Releasing the nut plate at 540 may include releasing the nut plate from the nut plate gripper. As discussed in more detail herein, the nut plate gripper may be utilized to position the nut plate relative to a structure and/or such that the nut plate may be operatively attached to the structure. In this context, the releasing at 540 may be performed subsequent to the gripping at 530 and/or subsequent to attachment of the nut plate to the structure.

In some examples, the releasing at 540 may include passively releasing the nut plate from the nut plate gripper. This may include passively releasing the nut plate responsive to a separation force that urges the first nut plate-contacting end and the second nut plate-contacting end from between the pair of opposed plate flanges. In some examples, the releasing at 540 may include actively releasing the nut plate from the nut plate gripper. This may include actuating a gripper actuator of the nut plate gripper. Examples of the gripper actuator are disclosed herein with reference to gripper actuator 496.

FIG. 8 is a flowchart depicting examples of methods 600 of utilizing a nut plate installation system according to the present disclosure. Examples of the nut plate installation system and/or components thereof are disclosed herein with reference to nut plate installation system 100. Methods 600 may include vibrating at 605 and include gripping a nut plate at 610 and retaining a plurality of rivets at 615. Methods 600 also may include applying a sealant at 620 and include aligning at 625, inserting pins at 630, positioning pins at 635, and setting the plurality of rivets at 640. Methods 600 further may include separating the end effector from the nut plate at 645 and/or inspecting at 650.

Vibrating at 605 may include vibrating the nut plate gripper and/or the nut plate and may be performed in any suitable manner. As an example, the vibrating at 605 may include vibrating the nut plate gripper and/or the nut plate during the gripping at 610 and/or during the positioning at 635. As another example, the vibrating at 605 may include vibrating with, via, and/or utilizing a vibration structure, examples of which are disclosed herein with reference to vibration structure 490.

Gripping the nut plate at 610 may include gripping the nut plate with a nut plate gripper of an end effector. The end effector may form a portion of and/or be operatively attached to a nut plate installation robot of the nut plate installation system. Examples of the nut plate are disclosed herein with reference to nut plate 140. Examples of the nut plate gripper are disclosed herein with reference to nut plate gripper 400. Examples of the end effector are disclosed herein with reference to end effector 300. Examples of the nut plate installation robot are disclosed herein with reference to nut plate installation robot 200. The gripping at 610 is illustrated in FIGS. 1 and 9, where nut plate 140 is gripped by nut plate gripper 400 of end effector 300 of nut plate installation robot 200 of nut plate installation system 100.

In some examples, the nut plate installation system may include a nut plate kitting structure, examples of which are disclosed herein with reference to nut plate kitting structure 130. In some such examples, the gripping at 610 may include obtaining the nut plate from the nut plate kitting structure. This may include obtaining the nut plate from and/or via a, a top and/or a horizontal nut plate kitting structure surface of the nut plate kitting structure.

Figure 10:
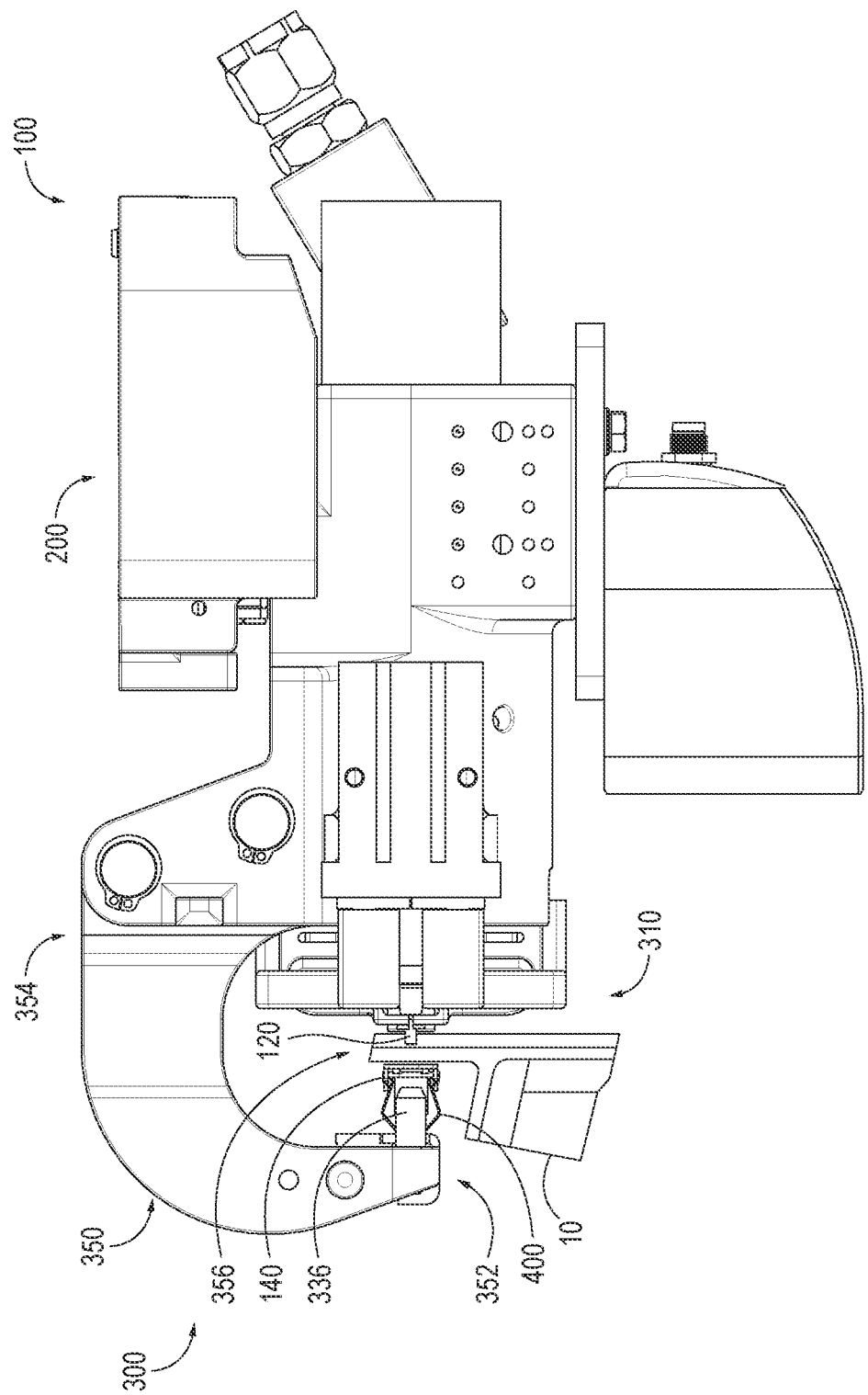
FIG. 10 is an illustration of a nut plate installation system during the methods of FIG. 8.

Retaining the plurality of rivets at 615 may include retaining the plurality of rivets with a rivet holder of the end effector. Examples of the rivet holder are disclosed herein with reference to rivet holder 310. In some examples, the nut plate installation system may include a rivet kitting structure, examples of which are disclosed herein with reference to rivet kitting structure 110. In some such examples, the retaining at 615 may include obtaining the plurality of rivets from the rivet kitting structure. This may include obtaining the plurality of rivets from and/or via a resilient receptacle of the rivet kitting structure. During the obtaining the plurality of rivets, the plurality of rivets may be oriented such that a pin of each rivet extends vertically above a corresponding rivet head of each rivet. The retaining at 615 is illustrated in FIGS. 1 and 10, where rivets 120 are gripped by rivet holder 310.

Applying the sealant at 620 may include applying the sealant to a structure-facing side of a structure-contacting region of a base plate of the nut plate. The applying at 620 may be performed in any suitable manner. As an example, the applying at 620 may include utilizing a roller to apply the sealant. As another example, the applying at 620 may include dipping the structure-facing side into a volume of the sealant. In some examples, the applying at 620 may be performed subsequent to the gripping at 610 and/or prior to the aligning at 625. In some examples, the applying at 620 may be performed while the structure is spaced-apart from a structure-receiving region of the end effector, which extends between the nut plate gripper and the rivet holder.

Aligning at 625 may be performed with, via, and/or utilizing the nut plate installation robot. The aligning at 625 may include aligning a plurality of base plate rivet openings of a base plate of the nut plate and/or a plurality of pins of the plurality of rivets with a plurality of structure rivet openings of the structure. Additionally or alternatively, the aligning at 625 may include positioning the structure within the structure-receiving region that extends between the nut plate gripper and the rivet holder and/or positioning the structure such that the structure extends between, or directly between, the nut plate gripper and the rivet holder. The aligning at 625 is illustrated in FIGS. 10-11, where structure 10 is positioned within structure-receiving region 356 and/or such that the structure extends between nut plate 140 and rivets 120.

In some examples, the aligning at 625 may include utilizing a vision system of the nut plate installation robot, such as to permit and/or to facilitate the alignment. In some such examples, the viewing may include verifying a position for the nut plate with the vision system, such as via verifying that the nut plate is positioned proximate and/or aligned with the structure and/or via verifying that the plurality of base plate rivet openings is aligned with the plurality of structure rivet openings of the structure. In some such examples, the verifying may include viewing the plurality of structure rivet openings with the vision system prior to the inserting at 630. In some such examples, the verifying may include verifying that the plurality of structure rivet openings is free of a corresponding rivet prior to the inserting at 630 and/or verifying that a spacing among the plurality of structure rivet openings corresponds to a spacing among the plurality of base plate rivet openings. Examples of the vision system are disclosed herein with reference to vision system 220.

Inserting the pins at 630 may include inserting the plurality of pins into the plurality of rivet structure openings. This may include inserting such that the plurality of pins protrudes from, extends from, and/or is separated by a distance from a nut plate gripper-facing side of the structure. In some examples, the gripping at 610 may include gripping the plurality of rivets with a rivet gripper of the end effector. In such examples, the inserting at 630 may include releasing the plurality of rivets from the rivet gripper. Examples of the rivet gripper are disclosed herein with reference to rivet gripper 314. In some examples, the inserting at 630 may include translating the plurality of rivets along a longitudinal axis of at least one pin of the plurality of pins. The inserting at 630 is illustrated by the transition from the configuration that is illustrated in FIG. 11 to the configuration that is illustrated in FIG. 12. As illustrated in FIG. 12, pins of rivets 120 protrude from, extend from, and/or are separated by a distance from nut plate gripper-facing side 14 of structure 10.

Positioning the pins at 635 may include positioning the plurality of pins within the plurality of base plate rivet openings of the base plate of the nut plate. This may, in some examples, include moving the nut plate over the plurality of pins while the plurality of pins is stationary, or at least substantially stationary. Additionally or alternatively, the positioning at 635 may include translating the nut plate along the longitudinal axis of at least one pin of at least one rivet of the plurality of rivets. The positioning at 635 is illustrated by the transition from the configuration that is illustrated in FIG. 12 to the configuration that is illustrated in FIG. 13. In FIG. 13, pins of rivets 120 are positioned within base plate rivet openings of nut plate 140.

Setting the plurality of rivets at 640 may include setting the plurality of rivets to operatively attach the nut plate to the structure. In some examples, the setting at 640 may include compressing the plurality of rivets with a rivet set structure of the end effector. In some examples, the setting at 640 may include compressing the plurality of rivets between an anvil of the rivet set structure and a die of the rivet set structure. The setting at 640 is illustrated by the transition from the configuration that is illustrated in FIG. 13 to the configuration that is illustrated in FIG. 14. In FIG. 14, pins of rivets 120 are being compressed between anvil 334 and die 336 of rivet set structure 330.

Separating the end effector from the nut plate at 645 may include separating the end effector from the nut plate and/or from the plurality of rivets. This may include separating while retaining the nut plate operatively attached to the structure via the plurality of rivets. Stated differently, and subsequent to the setting, the separating at 645 may include establishing a spaced-apart relationship between the structure and the structure-receiving region of the end effector. The separating at 645 is illustrated by the transition from the configuration that is illustrated in FIG. 14 to the configuration that is illustrated in FIG. 15. In FIG. 15, structure-receiving region 356 of end effector 300 is spaced-apart from structure 10 and nut plate 140 is operatively attached to structure 10 via rivets 120.

Inspecting at 650 may include inspecting the nut plate, the plurality of rivets, and/or the structure. This may include inspecting to confirm and/or to verify that the plurality of rivets attaches, or correctly attaches, the nut plate to the structure and may be performed subsequent to the setting at 640, subsequent to the separating at 645, and/or at least partially concurrently with the separating at 645. In some examples, the inspecting at 650 may include inspecting with, via, and/or utilizing the vision system of the nut plate installation system. This may include viewing the nut plate, the plurality of rivets, and/or the structure with the vision system.

In some examples, the inspecting at 650 may include confirming that the setting at 640 has been performed, has been performed completely, and/or has been performed satisfactorily. The confirming may include viewing the plurality of rivets, such as with the vision system. Additionally or alternatively, the confirming may include monitoring a linear travel of the rivet set structure, during the setting at 640, to confirm that at least a threshold travel magnitude and/or a threshold rivet compression has occurred.

Methods 600, which are disclosed herein, involve a plurality of interrelated steps that may be performed by the nut plate installation system. In some examples of methods 600, a plurality of steps of methods 600 may be performed with, via, and/or utilizing the end effector, or a single end effector. As examples, the vibrating at 605, the gripping at 610, the retaining at 615, the applying at 620, the aligning at 625, the inserting at 630, the positioning at 635, the setting at 640, the separating at 645, and/or the inspecting at 650 may be performed and/or facilitated by the single end effector. Stated differently, the end effector utilized with nut plate installation systems and/or methods, according to the present disclosure, may be a multi-functional end effector that may be adapted, configured, designed, and/or constructed to perform the plurality of steps. This may provide for more efficient and/or economical operation of the end effectors, nut plate installation systems, and/or methods when compared to prior art processes that manually perform the steps performed by the single end effector.

Illustrative, non-exclusive examples of inventive subject matter according to the present disclosure are described in the following enumerated paragraphs:

A1. A nut plate gripper (400) configured to grip a nut plate (140), the nut plate gripper (400) comprising:
 an attachment region (410), optionally configured to facilitate attachment of the nut plate gripper (400) to an end effector (300);
 a first resilient projecting region (430) that extends from the attachment region (410) and defines a first nut plate-contacting end (448); and
 a second resilient projecting region (460) that extends from the attachment region (410) and defines a second nut plate-contacting end (478);
 optionally wherein at least one of:
 (i) the first resilient projecting region (430) and the second resilient projecting region (460) are configured to resiliently deflect toward one another to facilitate insertion of the first nut plate-contacting end (448) and the second nut plate-contacting end (478) between a pair of opposed plate flanges (152) of a base plate (142) of the nut plate (140); and
 (ii) when the first nut plate-contacting end (448) and the second nut plate-contacting end (478) are positioned between the pair of opposed plate flanges (152) of the base plate (142) of the nut plate (140), the first resilient projecting region (430) and the second resilient projecting region (460) are configured to apply a retaining force (402) to the pair of opposed plate flanges (152).

A2. The nut plate gripper (400) of paragraph A1, wherein the attachment region (410) includes a fastener-receiving region (416) configured to receive a fastener that operatively attaches the nut plate gripper (400) to the end effector (300).

A3. The nut plate gripper (400) of any of paragraphs A1-A2, wherein the attachment region (410) includes a fastener-receiving hole defined within the nut plate gripper (400).

A4. The nut plate gripper (400) of any of paragraphs A1-A3, wherein the attachment region (410) defines a planar, or at least substantially planar, end effector-facing side (412).

A5. The nut plate gripper (400) of any of paragraphs A1-A4, wherein the attachment region (410) is a planar, or at least substantially planar, attachment region (410).

A6. The nut plate gripper (400) of any of paragraphs A1-A5, wherein the first resilient projecting region (430) and the second resilient projecting region (460) extend from an end effector-opposed side (414) of the attachment region (410).

A7. The nut plate gripper (400) of any of paragraphs A1-A6, wherein the first resilient projecting region (430) and the second resilient projecting region (460) symmetrically extend from the attachment region (410).

A8. The nut plate gripper (400) of any of paragraphs A1-A7, wherein the first resilient projecting region (430) and the second resilient projecting region (460) are mirror, or at least substantially mirror, images of one another.

A9. The nut plate gripper (400) of any of paragraphs A1-A8, wherein the first resilient projecting region (430) includes a first divergent region (432), which extends from the attachment region (410) and tapers away from the second resilient projecting region (460), and a first convergent region (440), which extends from the first divergent region (432) to the first nut plate-contacting end (448) and tapers toward the second resilient projecting region (460).

A10. The nut plate gripper (400) of paragraph A9, wherein the first divergent region (432) extends at a first divergent region angle (434) relative to the attachment region (410), optionally wherein the first divergent region angle (434) is at least one of:
 (i) an obtuse first divergent region angle (434);
 (ii) at least 90°, at least 100°, at least 110°, at least 120°, at least 130°, at least 140°, at least 150°, or at least 160°; and
 (iii) at most 170°, at most 160°, at most 150°, at most 140°, at most 130°, at most 120°, at most 110°, or at most 100°.

A11. The nut plate gripper (400) of any of paragraphs A9-A10, wherein the first divergent region (432) is a planar, or at least substantially planar, first divergent region (432).

A12. The nut plate gripper (400) of any of paragraphs A9-A11, wherein the first divergent region (432) extends a first divergent region length (436) from the attachment region (410), optionally wherein the first divergent region length (436) is at least one of:
 (i) at least 1 millimeter (mm), at least 1.5 mm, at least 2 mm, at least 2.5 mm, at least 3 mm, at least 3.5 mm, at least 4 mm, at least 4.5 mm, or at least 5 mm; and
 (ii) at most 10 mm, at most 9 mm, at most 8 mm, at most 7 mm, at most 6 mm, at most 5 mm, at most 4 mm, or at most 3 mm.

A13. The nut plate gripper (400) of any of paragraphs A9-A12, wherein the first divergent region (432) has an average first divergent region width (438), as measured perpendicular to a/the first divergent region length (436), optionally wherein the average first divergent region width (438) is at least one of:
 (i) at least 2 mm, at least 2.5 mm, at least 3 mm, at least 3.5 mm, at least 4 mm, at least 4.5 mm, at least 5 mm, at least 5.5 mm, or at least 6 mm; and (ii) at most 12 mm, at most 10 mm, at most 9 mm, at most 8 mm, at most 7 mm, at most 6 mm, at most 5 mm, or at most 4 mm.

A14. The nut plate gripper (400) of any of paragraphs A9-A13, wherein the first convergent region (440) extends at a first convergent region angle (442) relative to first divergent region (432), optionally wherein the first convergent region angle (442) is at least one of:
  (i) an obtuse first convergent region angle (442);
  (ii) at least 90°, at least 100°, at least 110°, at least 120°, at least 130°, at least 140°, at least 150°, or at least 160°; and
  (iii) at most 170°, at most 160°, at most 150°, at most 140°, at most 130°, at most 120°, at most 110°, or at most 100°.

A15. The nut plate gripper (400) of any of paragraphs A9-A14, wherein the first convergent region (440) is a planar, or at least substantially planar, first convergent region (440).

A16. The nut plate gripper (400) of any of paragraphs A9-A15, wherein the first convergent region (440) extends a first convergent region length (444) from the first divergent region (432), optionally wherein the first convergent region length (444) is at least one of:
  (i) at least 1 millimeter (mm), at least 1.5 mm, at least 2 mm, at least 2.5 mm, at least 3 mm, at least 3.5 mm, at least 4 mm, at least 4.5 mm, or at least 5 mm; and
  (ii) at most 10 mm, at most 9 mm, at most 8 mm, at most 7 mm, at most 6 mm, at most 5 mm, at most 4 mm, or at most 3 mm.

A17. The nut plate gripper (400) of any of paragraphs A9-A16, wherein the first convergent region (440) has an average first convergent region width (446), as measured perpendicular to a/the first convergent region length (444), optionally wherein the average first convergent region width (446) is at least one of:
  (i) at least 5 mm, at least 5.5 mm, at least 6 mm, at least 6.5 mm, at least 7 mm, at least 7.5 mm, at least 8 mm, at least 8.5 mm, or at least 9 mm; and
  (ii) at most 15 mm, at most 14 mm, at most 13 mm, at most 12 mm, at most 11 mm, at most 10 mm, at most 9 mm, or at most 8 mm.

A18. The nut plate gripper (400) of any of paragraphs A9-A17, wherein the first convergent region (440) includes a first pair of opposed ramps (452), which are positioned on opposed sides of the first convergent region (440) and project away from the first convergent region (440) such that, when the nut plate gripper (400) grips the nut plate (140), opposed outer edges of a first plate flange of the pair of opposed plate flanges (152) face toward the first pair of opposed ramps (452).

A19. The nut plate gripper (400) of any of paragraphs A1-A18, wherein the first nut plate-contacting end (448) includes a rounded first nut plate-contacting end (448), which is configured to contact the nut plate (140).

A20. The nut plate gripper (400) of any of paragraphs A1-A19, wherein the second resilient projecting region (460) includes a second divergent region (462), which extends from the attachment region (410) and tapers away from the first resilient projecting region (430), and a second convergent region (470), which extends from the second divergent region (462) to the second nut plate-contacting end (478) and tapers toward the first resilient projecting region (430).

A21. The nut plate gripper (400) of paragraph A20, wherein the second divergent region (462) extends at a second divergent region angle (464) relative to the attachment region (410), optionally wherein the second divergent region angle (464) is at least one of:
  (i) an obtuse second divergent region angle (464);
  (ii) at least 90°, at least 100°, at least 110°, at least 120°, at least 130°, at least 140°, at least 150°, or at least 160°; and
  (iii) at most 170°, at most 160°, at most 150°, at most 140°, at most 130°, at most 120°, at most 110°, or at most 100°.

A22. The nut plate gripper (400) of any of paragraphs A20-A21, wherein the second divergent region (462) is a planar, or at least substantially planar, second divergent region (462).

A23. The nut plate gripper (400) of any of paragraphs A20-A22, wherein the second divergent region (462) extends a second divergent region length (466) from the attachment region (410), optionally wherein the second divergent region length (466) is at least one of:
  (i) at least 1 millimeter (mm), at least 1.5 mm, at least 2 mm, at least 2.5 mm, at least 3 mm, at least 3.5 mm, at least 4 mm, at least 4.5 mm, or at least 5 mm; and
  (ii) at most 10 mm, at most 9 mm, at most 8 mm, at most 7 mm, at most 6 mm, at most 5 mm, at most 4 mm, or at most 3 mm.

A24. The nut plate gripper (400) of any of paragraphs A20-A23, wherein the second divergent region (462) has an average second divergent region width (468), as measured perpendicular to a/the second divergent region length (466), optionally wherein the average second divergent region width (468) is at least one of:
  (i) at least 2 mm, at least 2.5 mm, at least 3 mm, at least 3.5 mm, at least 4 mm, at least 4.5 mm, at least 5 mm, at least 5.5 mm, or at least 6 mm; and
  (ii) at most 12 mm, at most 10 mm, at most 9 mm, at most 8 mm, at most 7 mm, at most 6 mm, at most 5 mm, or at most 4 mm.

A25. The nut plate gripper (400) of any of paragraphs A20-A24, wherein the second convergent region (470) extends at a second convergent region angle (472) relative to the attachment region (410), optionally wherein the second convergent region angle (472) is at least one of:
  (i) an obtuse second convergent region angle (472);
  (ii) at least 90°, at least 100°, at least 110°, at least 120°, at least 130°, at least 140°, at least 150°, or at least 160°; and
  (iii) at most 170°, at most 160°, at most 150°, at most 140°, at most 130°, at most 120°, at most 110°, or at most 100°.

A26. The nut plate gripper (400) of any of paragraphs A20-A25, wherein the second convergent region (470) is a planar, or at least substantially planar, second convergent region (470).

A27. The nut plate gripper (400) of any of paragraphs A20-A26, wherein the second convergent region (470) extends a second convergent region length (474) from the second divergent region (462), optionally wherein the second convergent region length (474) is at least one of:
  (i) at least 1 millimeter (mm), at least 1.5 mm, at least 2 mm, at least 2.5 mm, at least 3 mm, at least 3.5 mm, at least 4 mm, at least 4.5 mm, or at least 5 mm; and
  (ii) at most 10 mm, at most 9 mm, at most 8 mm, at most 7 mm, at most 6 mm, at most 5 mm, at most 4 mm, or at most 3 mm.

A28. The nut plate gripper (400) of any of paragraphs A20-A27, wherein the second convergent region (470) has an average second convergent region width (476), as measured perpendicular to a/the second convergent region length (474), optionally wherein the average second convergent region width (476) is at least one of:
- (i) at least 5 mm, at least 5.5 mm, at least 6 mm, at least 6.5 mm, at least 7 mm, at least 7.5 mm, at least 8 mm, at least 8.5 mm, or at least 9 mm; and
- (ii) at most 15 mm, at most 14 mm, at most 13 mm, at most 12 mm, at most 11 mm, at most 10 mm, at most 9 mm, or at most 8 mm.

A29. The nut plate gripper (400) of any of paragraphs A20-A28, wherein the second convergent region (470) includes a second pair of opposed ramps (482), which are positioned on opposed sides of the second convergent region (470) and project away from the second convergent region (470) such that, when the nut plate gripper (400) grips the nut plate (140), opposed outer edges of a second plate flange of the pair of opposed plate flanges (152) face toward the second pair of opposed ramps (482).

A30. The nut plate gripper (400) of any of paragraphs A1-A29, wherein the second nut plate-contacting end (478) includes a rounded second nut plate-contacting end (478), which is configured to contact the nut plate (140).

A31. The nut plate gripper (400) of any of paragraphs A1-A30, wherein, when the nut plate gripper (400) grips the nut plate (140), a first retaining force (404) of the first resilient projecting region (430) and a second retaining force (406) of the second resilient projecting region (460) act against the base plate (142) of the nut plate (140) to retain the nut plate (140) on the nut plate gripper (400).

A32. The nut plate gripper (400) of any of paragraphs A1-A31, wherein, when the nut plate gripper (400) grips the nut plate (140):
- (i) the first nut plate-contacting end (448) is configured to define a corresponding two-point contact with the base plate (142) of the nut plate (140) to locate the base plate (142) relative to the first nut plate-contacting end (448) in two dimensions; and
- (ii) the second nut plate-contacting end (478) is configured to define another corresponding two-point contact with the base plate (142) of the nut plate (140) to locate the base plate (142) relative to the second nut plate-contacting end (478) in the two dimensions.

A33. The nut plate gripper (400) of any of paragraphs A1-A32, wherein the nut plate gripper (400) is configured to repeatedly grip, and to repeatedly release, the nut plate (140) without damage to the nut plate gripper (400).

A34. The nut plate gripper (400) of any of paragraphs A1-A33, wherein the nut plate gripper (400) is at least one of a unitary nut plate gripper (400) and a monolithic nut plate gripper (400).

A35. The nut plate gripper (400) of any of paragraphs A1-A34, wherein the nut plate gripper (400) is a metallic nut plate gripper (400).

A36. The nut plate gripper (400) of any of paragraphs A1-A35, wherein the nut plate gripper (400) is defined by at least one of a strip of steel and a strip of spring steel.

A37. The nut plate gripper (400) of any of paragraphs A1-A36, wherein the nut plate gripper (400) is a formed metallic strip.

A38. The nut plate gripper (400) of any of paragraphs A1-A37, wherein the nut plate gripper (400) is configured to passively grip the nut plate (140) responsive to an insertion force, which urges the first nut plate-contacting end (448) and the second nut plate-contacting end (478) between the pair of opposed plate flanges (152).

A39. The nut plate gripper (400) of any of paragraphs A1-A38, wherein the nut plate gripper (400) is configured to passively release the nut plate (140) responsive to a separation force, which urges the first nut plate-contacting end (448) and the second nut plate-contacting end (478) from between the pair of opposed plate flanges (152).

A40. The nut plate gripper (400) of any of paragraphs A1-A39, wherein the nut plate gripper (400) further includes a vibration structure (490) configured to vibrate the first resilient projecting region (430) and the second resilient projecting region (460) to at least one of:
- (i) facilitate insertion of the first nut plate-contacting end (448) and the second nut plate-contacting end (478) between the pair of opposed plate flanges (152); and
- (ii) facilitate positioning of base plate rivet openings (158) of the nut plate 140 onto corresponding rivets (120).

A41. The nut plate gripper (400) of any of paragraphs A1-A40, wherein the nut plate gripper (400) further includes a gripper actuator (496).

A42. The nut plate gripper (400) of paragraph A41, wherein the gripper actuator (496) is configured to selectively urge the first resilient projecting region (430) and the second resilient projecting region (460) toward one another to at least one of:
- (i) facilitate insertion of the first nut plate-contacting end (448) and the second nut plate-contacting end (478) between the pair of opposed plate flanges (152); and
- (ii) facilitate separation of the nut plate gripper (400) from the nut plate (140).

A43. The nut plate gripper (400) of any of paragraphs A41-A42, wherein the gripper actuator (496) is configured to selectively urge the first resilient projecting region (430) and the second resilient projecting region (460) away from one another to cause the nut plate gripper (400) to grip the nut plate (140).

A44. The nut plate gripper (400) of any of paragraphs A41-A43, wherein the gripper actuator (496) includes at least one of a mechanical actuator, a pneumatic actuator, a hydraulic actuator, a cam, and a double-acting cam.

A45. The nut plate gripper (400) of any of paragraphs A1-A44, wherein, when the nut plate gripper (400) grips the nut plate (140), the nut plate gripper (400) is entirely external a threaded central opening (172) of a nut (170) of the nut plate (140).

A46. The nut plate gripper (400) of any of paragraphs A1-A45, wherein the nut plate gripper (400) is configured to facilitate positioning of the nut plate (140) by the end effector (300) that includes the nut plate gripper (400).

A47. The nut plate gripper (400) of any of paragraphs A1-A46, wherein the nut plate gripper (400) includes the nut plate (140).

A48. The nut plate gripper (400) of any of paragraphs A1-A47, wherein the nut plate (140) includes the base plate (142), optionally wherein the base plate (142) includes at least one of:
- (i) a structure-contacting region (144) that defines a structure-facing side (146) and a structure-opposed side (148);
- (ii) a fastener opening (150) that extends through the structure-contacting region (144) of the base plate (142);
- (iii) a pair of opposed plate flanges (152) that extends at least one of away from the structure-facing side (146) of the base plate (142) and away from the structure-opposed side (148) of the base plate (142); and
- (iv) a plurality of base plate rivet openings (158) configured to receive a plurality of corresponding rivets (120).

A49. The nut plate gripper (400) of any of paragraphs A1-A48, wherein the nut plate (140) further includes a/the nut (170) that is operatively attached to the base plate (142), optionally wherein at least one of:
  (i) the nut (170) defines a/the threaded central opening (172) that is aligned with a/the fastener opening (150) of the base plate (142);
  (ii) the nut (170) is operatively attached to a/the structure-opposed side (148) of the base plate (142);
  (iii) the nut (170) is positioned between the pair of opposed plate flanges (152); and
  (iv) the nut plate (140) may be configured to permit limited motion of the nut (170) relative to the base plate (142), optionally wherein a spring clip (174) attaches the nut (170) to the nut plate (140) and permits the limited motion.

B1. A method of gripping a nut plate (140) utilizing a nut plate gripper (400), the method comprising:
  aligning a first nut plate-contacting end (448) of a first resilient projecting region (430) of the nut plate gripper (400) and a second nut plate-contacting end (478) of a second resilient projecting region (460) of the nut plate gripper (400) with a pair of opposed plate flanges (152) of a base plate (142) of the nut plate (140); and
  gripping the nut plate (140) with the nut plate gripper (400) by moving the nut plate gripper (400) and the nut plate (140) toward one another such that the first nut plate-contacting end (448) and the second nut plate-contacting end (478) are positioned between the pair of opposed plate flanges (152) and apply a retaining force (402) to the pair of opposed plate flanges (152).

B2. The method of paragraph B1, wherein the retaining force (402) includes a first retaining force (404), which is applied in a first force direction and by the first nut plate-contacting end (448), and a second retaining force (406), which is applied in a second force direction and by the second nut plate-contacting end (478), wherein the first force direction is opposed to the second force direction.

B3. The method of any of paragraphs B1-B2, wherein the retaining force (402) is a tensile retaining force (402).

B4. The method of any of paragraphs B1-B3, wherein the moving includes establishing a corresponding two-point contact between the first nut plate-contacting end (448) and the nut plate (140), and establishing another corresponding two-point contact between the second nut plate-contacting end (478) and the nut plate (140) to locate the nut plate (140) and the nut plate gripper (400) relative to one another in two dimensions.

B5. The method of any of paragraphs B1-B4, wherein the moving includes at least one of:
  (i) positioning a first opposed plate flange of the pair of opposed plate flanges (152) between a first pair of opposed ramps (452) of the nut plate gripper (400) to locate the nut plate (140) and the nut plate gripper (400) relative to one another in a third dimension, optionally that is perpendicular to the two dimensions; and
  (ii) positioning a second opposed plate flange of the pair of opposed plate flanges (152) between a second pair of opposed ramps (482) of the nut plate gripper (400) to locate the nut plate (140) and the nut plate gripper (400) relative to one another in the third dimension.

B6. The method of any of paragraphs B1-B5, wherein the moving includes deflecting the first resilient projecting region (430) and the second resilient projecting region (460) toward one another to permit the first nut plate-contacting end (448) and the second nut plate-contacting end (478) to be positioned between the pair of opposed plate flanges (152).

B7. The method of paragraph B6, wherein the retaining force (402) is a restoring force generated by the deflecting.

B8. The method of any of paragraphs B1-B7, wherein, subsequent to the gripping, the method further includes releasing the nut plate (140) from the nut plate gripper (400).

B9. The method of paragraph B8, wherein the releasing includes passively releasing the nut plate (140) from the nut plate gripper (400) responsive to a separation force that urges the first nut plate-contacting end (448) and the second nut plate-contacting end (478) from between the pair of opposed plate flanges (152).

B10. The method of any of paragraphs B8, wherein the releasing includes actively releasing the nut plate (140) from the nut plate gripper (400) by actuating a gripper actuator (496) of the nut plate gripper (400).

B11. The method of any of paragraphs B1-B10, wherein, during the gripping, the nut plate gripper (400) is at least one of:
  (i) entirely external a threaded central opening (172) of a nut (170) of the nut plate (140); and
  (ii) free from direct physical contact with the threaded central opening (172).

B12. The method of any of paragraphs B1-B11, wherein, during the moving, the method further includes vibrating at least one of the first nut plate-contacting end (448) and the second nut plate-contacting end (478).

B13. The method of any of paragraphs B1-B12, wherein the nut plate gripper (400) includes any suitable structure of any of the nut plate grippers (400) of any of paragraphs A1-A49.

C1. An end effector (300) configured to rivet a nut plate (140) to a structure (10), the end effector (300) comprising:
  a nut plate gripper (400);
  a rivet holder (310); and
  a yoke (350) that defines a nut plate gripper side (352) and a rivet holder side (354);
  optionally wherein the nut plate gripper (400) is operatively attached to the nut plate gripper side (352) of the yoke (350);
  optionally wherein the rivet holder (310) is operatively attached to the rivet holder side (354) of the yoke (350) such that the nut plate gripper (400) and the rivet holder (310) define a structure-receiving region (356) therebetween;
  optionally wherein the nut plate gripper (400) is configured to grip the nut plate (140) such that a structure-facing side (146) of a structure-contacting region (144) of a base plate (142) of the nut plate (140) faces toward the structure-receiving region (356); and
  optionally wherein the rivet holder (310) is configured to selectively retain a plurality of rivet heads (122) of a plurality of corresponding rivets (120), such that a plurality of pins (124) of the plurality of corresponding rivets (120) extends toward the structure-receiving region (356).

C2. The end effector (300) of paragraph C1, wherein the nut plate gripper (400) is configured to grip a structure-opposed side (148) of at least one of the nut plate (140) and the base plate (142) of the nut plate (140).

C3. The end effector (300) of any of paragraphs C1-C2, wherein, when the nut plate gripper (400) grips the nut plate (140), the nut plate gripper (400) is entirely external a threaded central opening (172) of a nut (170) of the nut plate (140).

C4. The end effector (300) of any of paragraphs C1-C3, wherein the nut plate gripper (400) is configured to grip a pair of opposed plate flanges (152) of the base plate (142) of the nut plate (140).

C5. The end effector (300) of paragraph C4, wherein the nut plate gripper (400) is configured to apply a tensile retaining force (402) to the pair of opposed plate flanges (152) of the base plate (142) of the nut plate (140).

C6. The end effector (300) of any of paragraphs C1-C5, wherein the nut plate gripper (400) is configured to passively grip the nut plate (140).

C7. The end effector (300) of any of paragraphs C1-C6, wherein the nut plate gripper (400) includes a gripper actuator (496) configured to actively actuate the nut plate gripper (400) to grip the nut plate (140).

C8. The end effector (300) of paragraph C7, wherein the gripper actuator (496) includes at least one of:
  (i) a mechanically actuated gripper actuator (496);
  (ii) an electrically actuated gripper actuator (496);
  (iii) a pneumatically actuated gripper actuator (496); and
  (iv) a hydraulically actuated gripper actuator (496).

C9. The end effector (300) of any of paragraphs C1-C8, wherein the nut plate gripper (400) is configured to utilize a vacuum force to grip the nut plate (140).

C10. The end effector (300) of any of paragraphs C1-C9, wherein the nut plate gripper (400) further includes a vibration structure (490) configured to vibrate the nut plate gripper (400) to at least one of:
  (i) facilitate alignment of the nut plate gripper (400) with the nut plate (140); and
  (ii) facilitate alignment of the nut plate (140) with the structure (10).

C11. The end effector (300) of any of paragraphs C1-C10, wherein the nut plate gripper (400) includes any suitable structure of any of the nut plate grippers (400) of any of paragraphs A1-A49.

C12. The end effector (300) of any of paragraphs C1-C11, wherein the nut plate gripper (400) is configured to perform any suitable function of any of the nut plate grippers (400) of any of paragraphs A1-A49 or any of the methods of any of paragraphs B1-B13.

C13. The end effector (300) of any of paragraphs C1-C12, wherein the rivet holder (310) defines a plurality of rivet-receiving regions (312) configured to receive the plurality of corresponding rivets (120).

C14. The end effector (300) of any of paragraphs C1-C13, wherein the rivet holder (310) includes a rivet gripper (314) configured to selectively grip the plurality of corresponding rivets (120).

C15. The end effector (300) of paragraph C14, wherein the rivet gripper (314) defines a gripping state, in which the rivet gripper (314) retains the plurality of corresponding rivets (120) within the rivet holder (310), and a free state, in which the plurality of corresponding rivets (120) is free to be separated from the rivet holder (310) via motion along at least one corresponding separation axis.

C16. The end effector (300) of any of paragraphs C1-C15, wherein the rivet holder (310) is configured to selectively retain the plurality of rivet heads (122) such that a relative orientation of the plurality of pins (124) corresponds to at least one of:
  (i) a relative orientation of a plurality of base plate rivet openings (158) defined within the base plate (142) of the nut plate (140); and
  (ii) a relative orientation of a plurality of structure rivet openings (12) defined within the structure (10).

C17. The end effector (300) of any of paragraphs C1-C16, wherein the end effector (300) further includes a rivet set structure (330) configured to set the plurality of corresponding rivets (120) such that the plurality of corresponding rivets (120) operatively attaches the base plate (142) of the nut plate (140) to the structure (10).

C18. The end effector (300) of paragraph C17, wherein the rivet set structure (330) includes an anvil (334) and a die (336), wherein the anvil (334) is configured to act upon the plurality of rivet heads (122) to compress the plurality of corresponding rivets (120) between the anvil (334) and the die (336).

C19. The end effector (300) of paragraph C18, wherein the rivet set structure (330) includes a set structure linear actuator (332) configured to operatively translate the anvil (334) relative to the die (336) to compress the plurality of corresponding rivets (120) between the anvil (334) and the die (336).

C20. The end effector (300) of any of paragraphs C18-C19, wherein the anvil (334) is operatively attached to the rivet holder side (354) of the yoke (350) and faces toward the nut plate gripper side (352) of the yoke (350).

C21. The end effector (300) of any of paragraphs C18-C20, wherein the die (336) is operatively attached to the nut plate gripper side (352) of the yoke (350) and faces toward the rivet holder side (354) of the yoke (350).

C22. The end effector (300) of any of paragraphs C18-C21, wherein the die (336) extends at least partially between a/the first resilient projecting region (430) of the nut plate gripper (400) and a/the second resilient projecting region (460) of the nut plate gripper (400).

C23. The end effector (300) of any of paragraphs C18-C22, wherein the die (336) includes a chamfered die end sized to provide clearance between the die (336) and the nut plate gripper (400).

D1. A nut plate installation robot (200), comprising:
  a robot arm (210);
  the end effector (300) of any of paragraphs C1-C23, wherein the end effector (300) is operatively attached to the robot arm (210); and
  a vision system (220) configured to view at least one of the end effector (300), the nut plate gripper (400), the nut plate (140), the plurality of corresponding rivets (120), and the structure (10) to facilitate alignment among the nut plate (140), the plurality of corresponding rivets (120), and the structure (10).

E1. A nut plate installation system (100), comprising:
  the nut plate installation robot (200) of paragraph D1; and
  at least one of:
  (i) a rivet kitting structure (110);
  (ii) a nut plate kitting structure (130); and
  (iii) a sealant application structure (180) configured to apply a sealant (186) to the nut plate (140).

E2. The nut plate installation system (100) of paragraph E1, wherein the rivet kitting structure (110) is configured to supply the plurality of corresponding rivets (120) to the nut plate installation robot (200).

E3. The nut plate installation system (100) of any of paragraphs E1-E2, wherein the rivet kitting structure (110) contains a plurality of sets of the plurality of corresponding rivets (120).

E4. The nut plate installation system (100) of any of paragraphs E1-E3, wherein the rivet kitting structure (110) includes a plurality of resilient receptacles (114) configured to resiliently retain the plurality of corresponding rivets (120).

E5. The nut plate installation system (100) of any of paragraphs E1-E4, wherein the rivet kitting structure (110) is configured to retain the plurality of corresponding rivets (120) in a vertical orientation in which the plurality of pins (124) extends vertically upward from the plurality of rivet heads (122).

E6. The nut plate installation system (100) of any of paragraphs E1-E5, wherein the rivet kitting structure (110) is a rotary rivet kitting structure (112) configured to rotate to make the plurality of corresponding rivets (120) accessible to the end effector (300).

E7. The nut plate installation system (100) of any of paragraphs E1-E6, wherein the nut plate kitting structure (130) is configured to supply the nut plate (140) to the nut plate installation robot (200).

E8. The nut plate installation system (100) of any of paragraphs E1-E7, wherein the nut plate kitting structure (130) contains a plurality of nut plates (140).

E9. The nut plate installation system (100) of any of paragraphs E1-E8, wherein the nut plate kitting structure (130) is configured to support the nut plate (140) on a horizontal nut plate kitting structure surface (134).

E10. The nut plate installation system (100) of any of paragraphs E1-E9, wherein the nut plate kitting structure (130) is a rotary nut plate kitting structure (132) configured to rotate to make the nut plate (140) accessible to the end effector (300).

E11. The nut plate installation system (100) of any of paragraphs E1-E10, wherein the sealant application structure (180) is configured to apply the sealant (186) to the structure-facing side (146) of the structure-contacting region (144) of the base plate (142) of the nut plate (140).

E12. The nut plate installation system (100) of paragraph E11, wherein the sealant application structure (180) includes at least one of:
  (i) a roller (182) configured to apply the sealant (186) to the structure-facing side (146); and
  (ii) a volume (184) of sealant (186) within which the nut plate installation robot (200) is configured to dip the structure-facing side (146).

E13. The nut plate installation system (100) of any of paragraphs E11-E12, wherein the sealant application structure (180) is configured to apply the sealant (186) at least one of:
  (i) while the nut plate (140) is gripped by the nut plate gripper (400); and
  (ii) while the structure (10) is spaced-apart from the structure-receiving region (356).

F1. A method of utilizing a nut plate installation system (100), the method comprising:
  gripping, with a nut plate gripper (400) of an end effector (300) of a nut plate installation robot (200) of the nut plate installation system (100), a nut plate (140);
  retaining, with a rivet holder (310) of the end effector (300), a plurality of corresponding rivets (120);
  aligning, with the nut plate installation robot (200), a plurality of base plate rivet openings (158) of a base plate (142) of the nut plate (140), and a plurality of pins (124) of the plurality of corresponding rivets (120) with a plurality of structure rivet openings (12) of a structure (10);
  inserting the plurality of pins (124) of the plurality of corresponding rivets (120) into the plurality of structure rivet openings (12) such that the plurality of pins (124) protrudes from a nut plate gripper-facing side (14) of the structure (10);

positioning the plurality of pins (124) within the plurality of base plate rivet openings (158); and
  setting the plurality of corresponding rivets (120) to operatively attach the nut plate (140) to the structure (10).

F2. The method of paragraph F1, wherein the method includes utilizing a single end effector (300) to perform the gripping, the retaining, and the setting.

F3. The method of any of paragraphs F1-F2, wherein the end effector (300) defines a structure-receiving region (356), which extends between the nut plate gripper (400) and the rivet holder (310), and further wherein the aligning includes positioning the structure (10) within the structure-receiving region (356).

F4. The method of any of paragraphs F1-F3, wherein the method further includes vibrating at least one of the nut plate gripper (400) and the nut plate (140) at least one of:
  (i) during the gripping; and
  (ii) during the positioning.

F5. The method of any of paragraphs F1-F4, wherein the aligning includes utilizing a vision system (220) of the nut plate installation robot (200).

F6. The method of paragraph F5, wherein the aligning includes viewing the plurality of structure rivet openings (12) with the vision system (220) and prior to the inserting.

F7. The method of any of paragraphs F5-F6, wherein the utilizing further includes verifying a position for the nut plate (140) with the vision system (220).

F8. The method of paragraph F7, wherein the verifying includes at least one of:
  (i) verifying that the plurality of structure rivet openings (12) are free of corresponding rivets (120) prior to the inserting; and
  (ii) verifying that a spacing among the plurality of structure rivet openings (12) corresponds to a spacing among the plurality of base plate rivet openings (158).

F9. The method of any of paragraphs F1-F8, wherein the aligning includes positioning the structure (10) directly between the nut plate gripper (400) and the rivet holder (310).

F10. The method of any of paragraphs F1-F9, wherein the retaining includes gripping the plurality of corresponding rivets (120) with a rivet gripper (314) of the end effector (300), and further wherein the inserting includes releasing the plurality of corresponding rivets (120) from the rivet gripper (314).

F11. The method of any of paragraphs F1-F10, wherein the inserting includes translating the plurality of corresponding rivets (120) along a longitudinal axis of at least one pin (124) of the plurality of pins (124).

F12. The method of any of paragraphs F1-F11, wherein the positioning includes translating the nut plate (140) along a/the longitudinal axis of at least one pin (124) of the plurality of pins (124).

F13. The method of any of paragraphs F1-F12, wherein the setting includes compressing the plurality of corresponding rivets (120) with a rivet set structure (330) of the end effector (300).

F14. The method of paragraph F13, wherein the compressing includes compressing between an anvil (334) and a die (336) of the rivet set structure (330).

F15. The method of any of paragraphs F1-F14, wherein, subsequent to the setting, the method further includes separating the end effector (300) from the nut plate (140) and from the plurality of corresponding rivets (120).

F16. The method of any of paragraphs F1-F15, wherein, subsequent to the setting, the method further includes establishing a spaced-apart relationship between the structure (10) and a/the structure-receiving region (356) of the end effector (300).

F17. The method of any of paragraphs F1-F16, wherein the gripping includes obtaining the nut plate (140) from a nut plate kitting structure (130).

F18. The method of any of paragraphs F1-F17, wherein the retaining includes obtaining the plurality of corresponding rivets (120) from a rivet kitting structure (110).

F19. The method of any of paragraphs F1-F18, wherein, subsequent to the gripping and prior to the aligning, the method further includes applying a sealant (186) to a structure-facing side (146) of a structure-contacting region (144) of the base plate (142) of the nut plate (140).

F20. The method of any of paragraphs F1-F19, wherein, subsequent to the setting, the method further includes inspecting at least one of the nut plate (140), the plurality of corresponding rivets (120), and the structure (10).

F21. The method of paragraph F20, wherein the inspecting includes verifying attachment of the nut plate (140) to the structure (10) via the plurality of corresponding rivets (120).

F22. The method of any of paragraphs F20-F21, wherein the inspecting includes viewing at least one of the nut plate (140), the plurality of corresponding rivets (120), and the structure (10) utilizing a/the vision system (220) of the nut plate installation robot (200).

F23. The method of any of paragraphs F1-F22, wherein the nut plate gripper (400) includes any suitable structure of any suitable nut plate gripper (400) of any of paragraphs A1-A49.

F24. The method of any of paragraphs F1-F23, wherein the method further includes performing any suitable function of any of the nut plate grippers (400) of any of paragraphs A1-A49.

F25. The method of any of paragraphs F1-F24, wherein the method further includes gripping the nut plate (140) according to any suitable step of any of the methods of any of paragraphs B1-B13.

F26. The method of any of paragraphs F1-F25, wherein the end effector (300) includes any suitable structure of any of the end effectors (300) of any of paragraphs C1-C23.

F27. The method of any of paragraphs F1-F26, wherein the method further includes performing any suitable function of any of the end effectors (300) of any of paragraphs C1-C23.

F28. The method of any of paragraphs F1-F27, wherein the nut plate installation robot (200) further includes any suitable structure of the nut plate installation robot (200) of paragraph D1.

F29. The method of any of paragraphs F1-F28, wherein the nut plate installation system (100) includes any suitable structure of any of the nut plate installation systems (100) of any of paragraphs E1-E13.

F30. The method of any of paragraphs F1-F29, wherein the method further includes performing any suitable function of any of the nut plate installation systems (100) of any of paragraphs E1-E13.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A nut plate gripper configured to grip a nut plate, the nut plate gripper comprising:
   an attachment region, configured to facilitate attachment of the nut plate gripper to an end effector;
   a first resilient projecting region that extends from the attachment region and defines a first nut plate-contacting end; and
   a second resilient projecting region that extends from the attachment region and defines a second nut plate-contacting end;
   wherein the first resilient projecting region and the second resilient projecting region are configured to resiliently deflect toward one another to facilitate insertion of the first nut plate-contacting end and the second nut plate-contacting end between a pair of opposed plate flanges of a base plate of the nut plate; and
   further wherein the nut plate gripper further includes a vibration structure configured to vibrate the first resilient projecting region and the second resilient projecting region to at least one of:
   (i) facilitate insertion of the first nut plate-contacting end and the second nut plate-contacting end between the pair of opposed plate flanges; and
   (ii) facilitate positioning of base plate rivet openings of the nut plate onto corresponding rivets.

2. The nut plate gripper of claim 1, wherein the first resilient projecting region includes a first divergent region, which extends from the attachment region and tapers away from the second resilient projecting region, and a first convergent region, which extends from the first divergent region to the first nut plate-contacting end and tapers toward the second resilient projecting region.

3. The nut plate gripper of claim 1, wherein the second resilient projecting region includes a second divergent region, which extends from the attachment region and tapers away from the first resilient projecting region, and a second convergent region, which extends from the second divergent region to the second nut plate-contacting end and tapers toward the first resilient projecting region.

4. The nut plate gripper of claim 1, wherein, when the nut plate gripper grips the nut plate, a first retaining force of the first resilient projecting region and a second retaining force of the second resilient projecting region act against the base plate of the nut plate to retain the nut plate on the nut plate gripper.

5. The nut plate gripper of claim 1, wherein, when the nut plate gripper grips the nut plate:
   (i) the first nut plate-contacting end is configured to define a corresponding two-point contact with the base plate of the nut plate to locate the base plate relative to the first nut plate-contacting end in two dimensions; and
   (ii) the second nut plate-contacting end is configured to define another corresponding two-point contact with the base plate of the nut plate to locate the base plate relative to the second nut plate-contacting end in the two dimensions.

6. The nut plate gripper of claim 1, wherein the nut plate gripper is configured to passively grip the nut plate responsive to an insertion force, which urges the first nut plate-contacting end and the second nut plate-contacting end between the pair of opposed plate flanges.

7. The nut plate gripper of claim 1, wherein the nut plate gripper is configured to passively release the nut plate responsive to a separation force, which urges the first nut plate-contacting end and the second nut plate-contacting end from between the pair of opposed plate flanges.

8. The nut plate gripper of claim 1, wherein the nut plate gripper further includes a gripper actuator.

9. The nut plate gripper of claim 8, wherein the gripper actuator is configured to selectively urge the first resilient projecting region and the second resilient projecting region toward one another to at least one of:
   (i) facilitate insertion of the first nut plate-contacting end and the second nut plate-contacting end between the pair of opposed plate flanges; and
   (ii) facilitate separation of the nut plate gripper from the nut plate.

10. A method of gripping a nut plate utilizing a nut plate gripper, the method comprising:
    aligning a first nut plate-contacting end of a first resilient projecting region of the nut plate gripper and a second nut plate-contacting end of a second resilient projecting region of the nut plate gripper with a pair of opposed plate flanges of a base plate of the nut plate;
    gripping the nut plate with the nut plate gripper by moving the nut plate gripper and the nut plate toward one another such that the first nut plate-contacting end and the second nut plate-contacting end are positioned between the pair of opposed plate flanges and apply a retaining force to the pair of opposed plate flanges; and
    wherein, during the moving, the method further includes vibrating at least one of the first nut plate-contacting end and the second nut plate-contacting end.

11. The method of claim 10, wherein the retaining force includes a first retaining force, which is applied in a first force direction and by the first nut plate-contacting end, and a second retaining force, which is applied in a second force direction and by the second nut plate-contacting end, wherein the first force direction is opposed to the second force direction.

12. The method of claim 10, wherein the retaining force is a tensile retaining force.

13. The method of claim 10, wherein the moving includes establishing a corresponding two-point contact between the first nut plate-contacting end and the nut plate, and establishing another corresponding two-point contact between the second nut plate-contacting end and the nut plate to locate the nut plate and the nut plate gripper relative to one another in two dimensions.

14. The method of claim 10, wherein the moving includes at least one of:
  (i) positioning a first opposed plate flange of the pair of opposed plate flanges between a first pair of opposed ramps of the nut plate gripper to locate the nut plate and the nut plate gripper relative to one another in a third dimension that is perpendicular to two dimensions; and
  (ii) positioning a second opposed plate flange of the pair of opposed plate flanges between a second pair of opposed ramps of the nut plate gripper to locate the nut plate and the nut plate gripper relative to one another in the third dimension.

15. The method of claim 10, wherein the moving includes deflecting the first resilient projecting region and the second resilient projecting region toward one another to permit the first nut plate-contacting end and the second nut plate-contacting end to be positioned between the pair of opposed plate flanges.

16. The method of claim 10, wherein, subsequent to the gripping, the method further includes releasing the nut plate from the nut plate gripper.

17. The method of claim 16, wherein the releasing includes passively releasing the nut plate from the nut plate gripper responsive to a separation force that urges the first nut plate-contacting end and the second nut plate-contacting end from between the pair of opposed plate flanges.

18. The method of claim 16, wherein the releasing includes actively releasing the nut plate from the nut plate gripper by actuating a gripper actuator of the nut plate gripper.

19. A nut plate gripper configured to grip a nut plate, the nut plate gripper comprising:
  an attachment region, configured to facilitate attachment of the nut plate gripper to an end effector;
  a first resilient projecting region that extends from the attachment region and defines a first nut plate-contacting end;
  a second resilient projecting region that extends from the attachment region and defines a second nut plate-contacting end; and
  a gripper actuator;
  wherein the first resilient projecting region and the second resilient projecting region are configured to resiliently deflect toward one another to facilitate insertion of the first nut plate-contacting end and the second nut plate-contacting end between a pair of opposed plate flanges of a base plate of the nut plate.

20. The nut plate gripper of claim 19, wherein the gripper actuator is configured to selectively urge the first resilient projecting region and the second resilient projecting region toward one another, to at least one of:
  (i) facilitate insertion of the first nut plate-contacting end and the second nut plate-contacting end between the pair of opposed plate flanges; and
  (ii) facilitate separation of the nut plate gripper from the nut plate.

21. A method of gripping a nut plate utilizing a nut plate gripper, the method comprising:
  aligning a first nut plate-contacting end of a first resilient projecting region of the nut plate gripper and a second nut plate-contacting end of a second resilient projecting region of the nut plate gripper with a pair of opposed plate flanges of a base plate of the nut plate; and
  gripping the nut plate with the nut plate gripper by moving the nut plate gripper and the nut plate toward one another such that the first nut plate-contacting end and the second nut plate-contacting end are positioned between the pair of opposed plate flanges and apply a retaining force to the pair of opposed plate flanges;
  wherein the moving includes at least one of:
  (i) positioning a first opposed plate flange of the pair of opposed plate flanges between a first pair of opposed ramps of the nut plate gripper to locate the nut plate and the nut plate gripper relative to one another in a third dimension that is perpendicular to two dimensions; and
  (ii) positioning a second opposed plate flange of the pair of opposed plate flanges between a second pair of opposed ramps of the nut plate gripper to locate the nut plate and the nut plate gripper relative to one another in the third dimension.

22. A method of gripping a nut plate utilizing a nut plate gripper, the method comprising:
  aligning a first nut plate-contacting end of a first resilient projecting region of the nut plate gripper and a second nut plate-contacting end of a second resilient projecting region of the nut plate gripper with a pair of opposed plate flanges of a base plate of the nut plate;
  gripping the nut plate with the nut plate gripper by moving the nut plate gripper and the nut plate toward one another such that the first nut plate-contacting end and the second nut plate-contacting end are positioned between the pair of opposed plate flanges and apply a retaining force to the pair of opposed plate flanges; and
  subsequent to the gripping, releasing the nut plate from the nut plate gripper, wherein the releasing includes actively releasing the nut plate from the nut plate gripper by actuating a gripper actuator of the nut plate gripper.

* * * * *